US012028490B2

(12) United States Patent
Inoue

(10) Patent No.: US 12,028,490 B2
(45) Date of Patent: Jul. 2, 2024

(54) SERVER FOR PROVIDING A SETTING SCREEN WITH PREVIOUSLY USED SETTINGS TO A CLIENT APPARATUS FOR IMAGE TRANSMISSION

(71) Applicant: CANON KABUSHIKI KAISHA, Tokyo (JP)

(72) Inventor: Kenta Inoue, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/214,172

(22) Filed: Mar. 26, 2021

(65) Prior Publication Data

US 2021/0306476 A1    Sep. 30, 2021

(30) Foreign Application Priority Data

Mar. 30, 2020 (JP) .................................. 2020-060760

(51) Int. Cl.
*H04N 1/00* (2006.01)

(52) U.S. Cl.
CPC ..... *H04N 1/00214* (2013.01); *H04N 1/00244* (2013.01); *H04N 1/00474* (2013.01); *H04N 1/00482* (2013.01)

(58) Field of Classification Search
CPC .................. H04N 1/00214; H04N 1/00244
See application file for complete search history.

(56) References Cited

U.S. PATENT DOCUMENTS

| 2009/0089811 A1* | 4/2009 | Ferlitsch | G06F 3/1287 719/321 |
| 2012/0079409 A1* | 3/2012 | Luo | G06F 8/34 715/772 |
| 2013/0201509 A1* | 8/2013 | Miyazawa | H04N 1/00244 358/1.13 |
| 2014/0325604 A1* | 10/2014 | Nguyenvan | H04L 63/0815 726/4 |
| 2015/0040187 A1* | 2/2015 | Fujii | H04L 63/0876 726/3 |
| 2015/0302277 A1 | 10/2015 | Suzuki | |
| 2016/0165076 A1* | 6/2016 | Tokiwa | H04N 1/00244 358/1.15 |
| 2017/0237868 A1* | 8/2017 | Sato | G06V 30/416 358/402 |

(Continued)

FOREIGN PATENT DOCUMENTS

| CN | 104137526 A | 11/2004 |
| CN | 108833729 A | 11/2018 |

(Continued)

OTHER PUBLICATIONS

Lv, Xiao-Qi, et al., Research of image layout display technology based on the medical image workstation, Journal of Inner Mongolia University of Science and Technology, vol. 30, No. 1, Mar. 2011.

*Primary Examiner* — Benjamin O Dulaney
(74) *Attorney, Agent, or Firm* — Canon U.S.A., Inc. IP Division

(57) ABSTRACT

To solve a troublesome setting operation required in transmitting image data to a cloud storage, a setting screen is provided in which a setting made by a user in the past for image data that is similar to the image data to be transmitted is reflected, when the user makes a setting for transmitting the image data to be transmitted to the cloud storage.

10 Claims, 23 Drawing Sheets

(56) References Cited

U.S. PATENT DOCUMENTS

| | | | |
|---|---|---|---|
| 2018/0139343 A1* | 5/2018 | Igawa | G06F 3/1204 |
| 2018/0217797 A1* | 8/2018 | Inoue | H04N 1/00408 |
| 2018/0314474 A1* | 11/2018 | Nakaya | G06F 3/1204 |
| 2019/0132481 A1* | 5/2019 | Yasui | H04N 1/444 |
| 2019/0228220 A1 | 7/2019 | Matsumoto | |
| 2019/0230231 A1 | 7/2019 | Ono | |
| 2019/0230232 A1 | 7/2019 | Soga | |
| 2019/0289160 A1* | 9/2019 | Hayashi | G06F 9/453 |
| 2020/0034090 A1 | 1/2020 | Iida et al. | |
| 2020/0162627 A1* | 5/2020 | Utoh | H04N 1/00209 |

FOREIGN PATENT DOCUMENTS

| | | |
|---|---|---|
| CN | 108933876 A | 12/2018 |
| CN | 109726173 A | 5/2019 |
| JP | 2003036157 A | 2/2003 |
| JP | 2013232084 A | 11/2013 |
| JP | 2017228970 A | 12/2017 |
| JP | 2019041150 A | 3/2019 |

\* cited by examiner

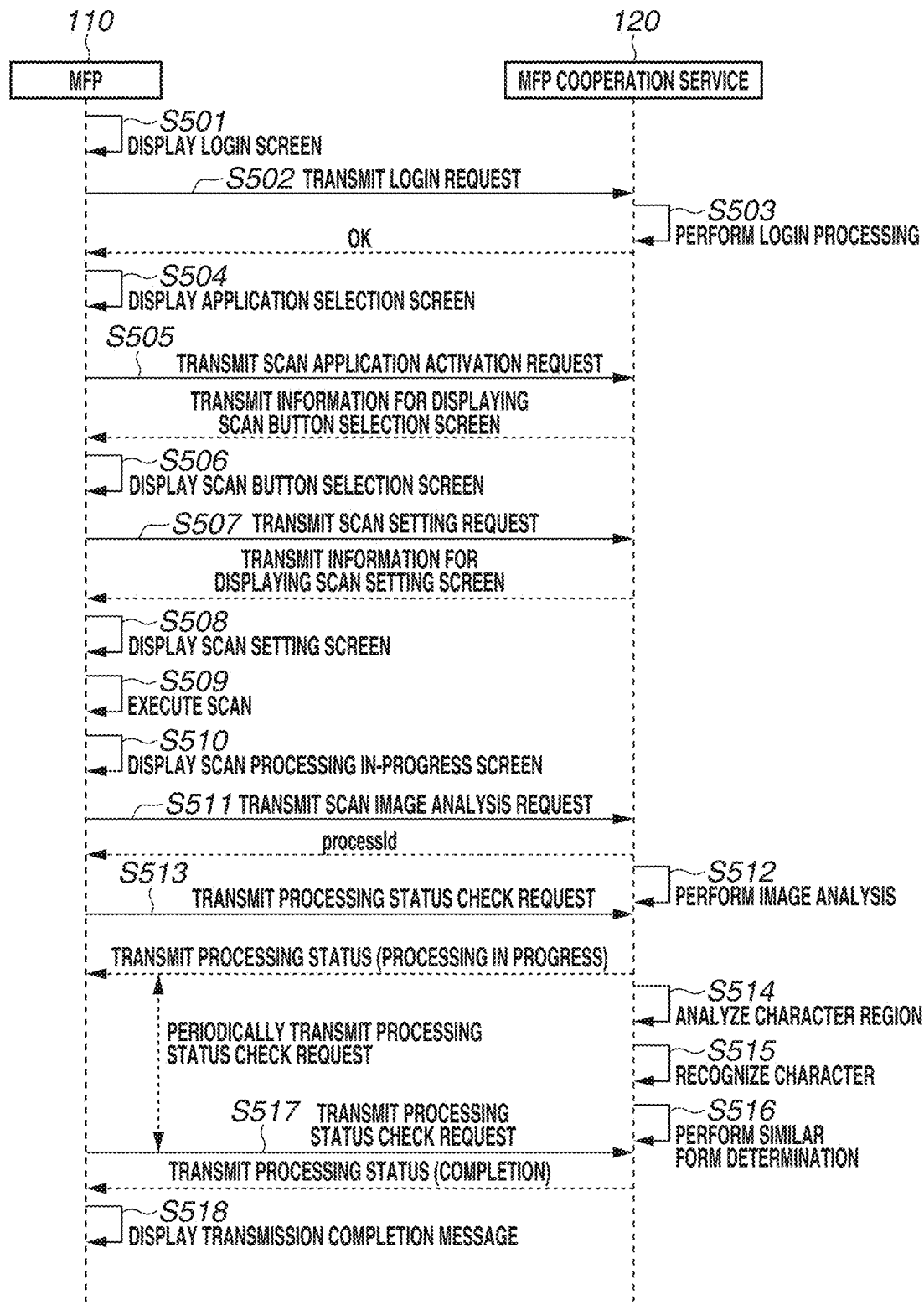

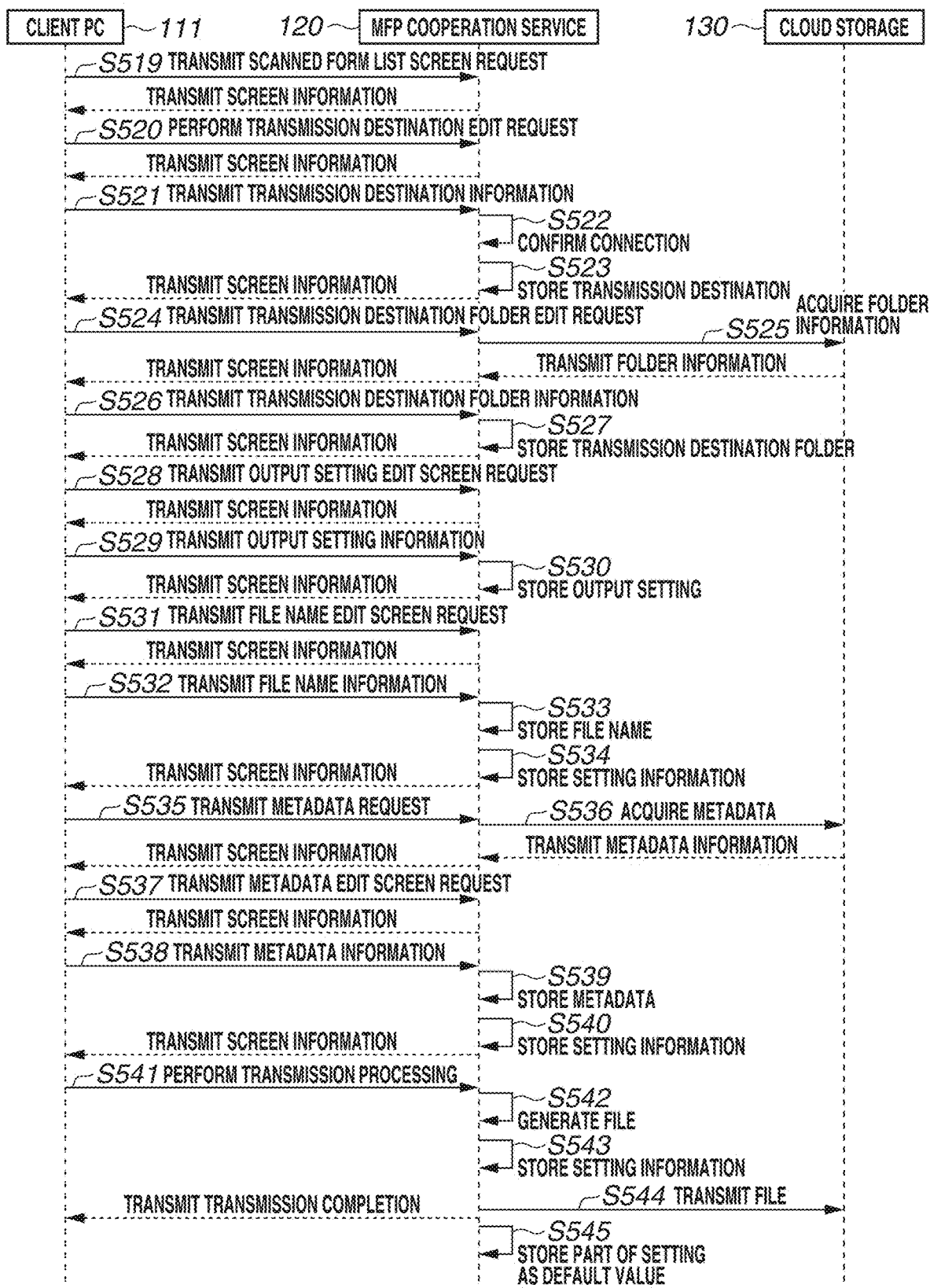

FIG.7

SCANNED FOLDER LIST

| SEND | EDIT | DELETE | | | REFRESH |
|---|---|---|---|---|---|

SCAN JOB | DATE | TRANSMISSION DESTINATION

- ☑ [thumbnail] — NO NAME JOB — / 2 PAGES / UNLEARNED | 2019/09/19 19:08 | UNSET
- ☐ [thumbnail] — NO NAME JOB — / 2 PAGES / UNLEARNED | 2019/09/19 19:10 | UNSET
- ☐ [thumbnail] — NO NAME JOB — / 2 PAGES / UNLEARNED | 2019/09/19 19:12 | UNSET

JOB PROPERTIES

SETTING

TRANSMISSION DESTINATION
CLICK TO OPEN SETTING

TRANSMISSION DESTINATION FOLDER
SELECT TRANSMISSION DESTINATION FIRST

FILE FORMAT
CLOUD COMPRESSED PDF

FILE NAME
⊕ CLICK TO ADD UP TO 3 OCR BLOCKS
NONE ✎ EDIT

[ SAVE ]

Labels: 701, 702, 703, 704, 705, 706, 707, 708, 709, 710, 711, 712, 713, 714, 715

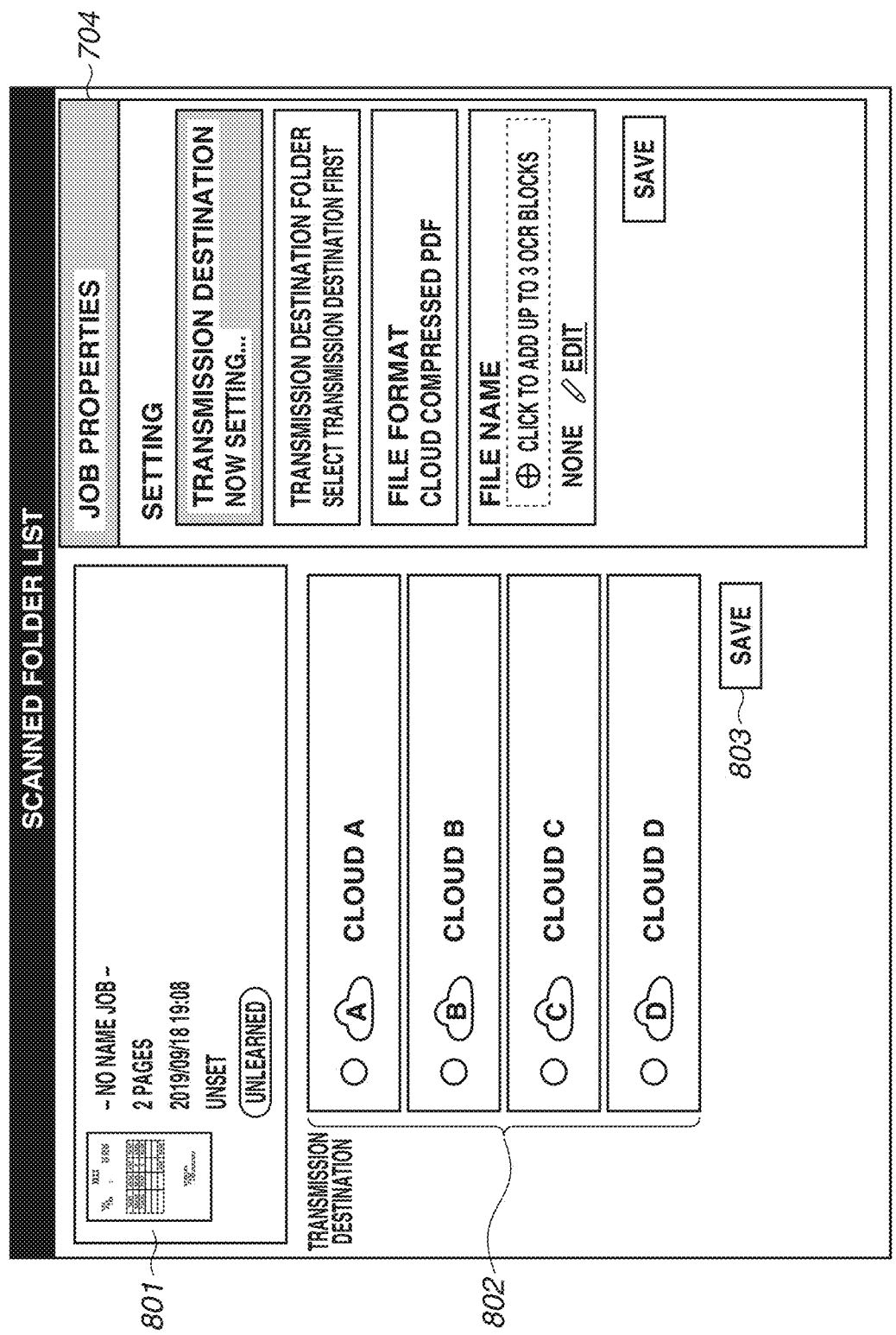

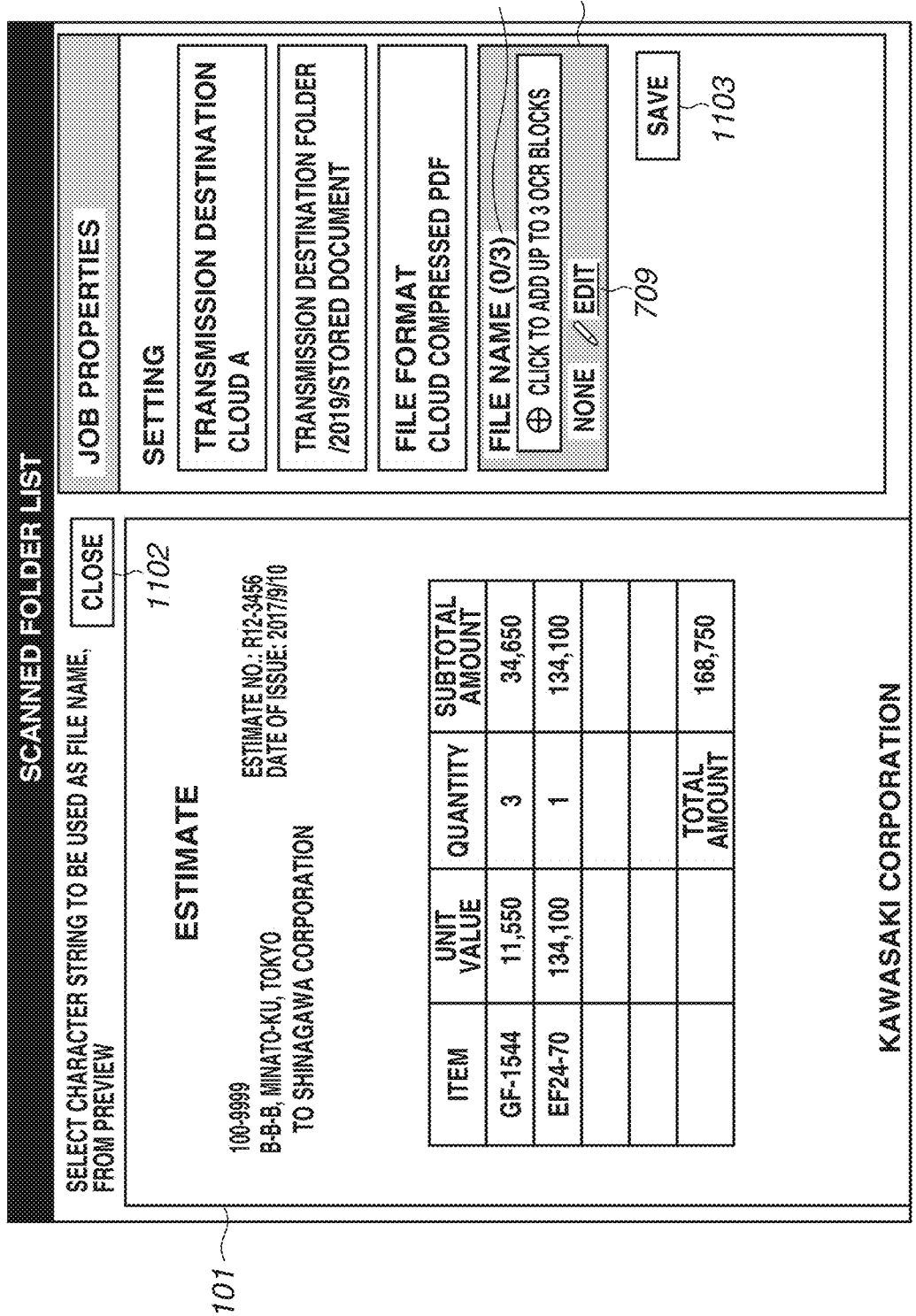

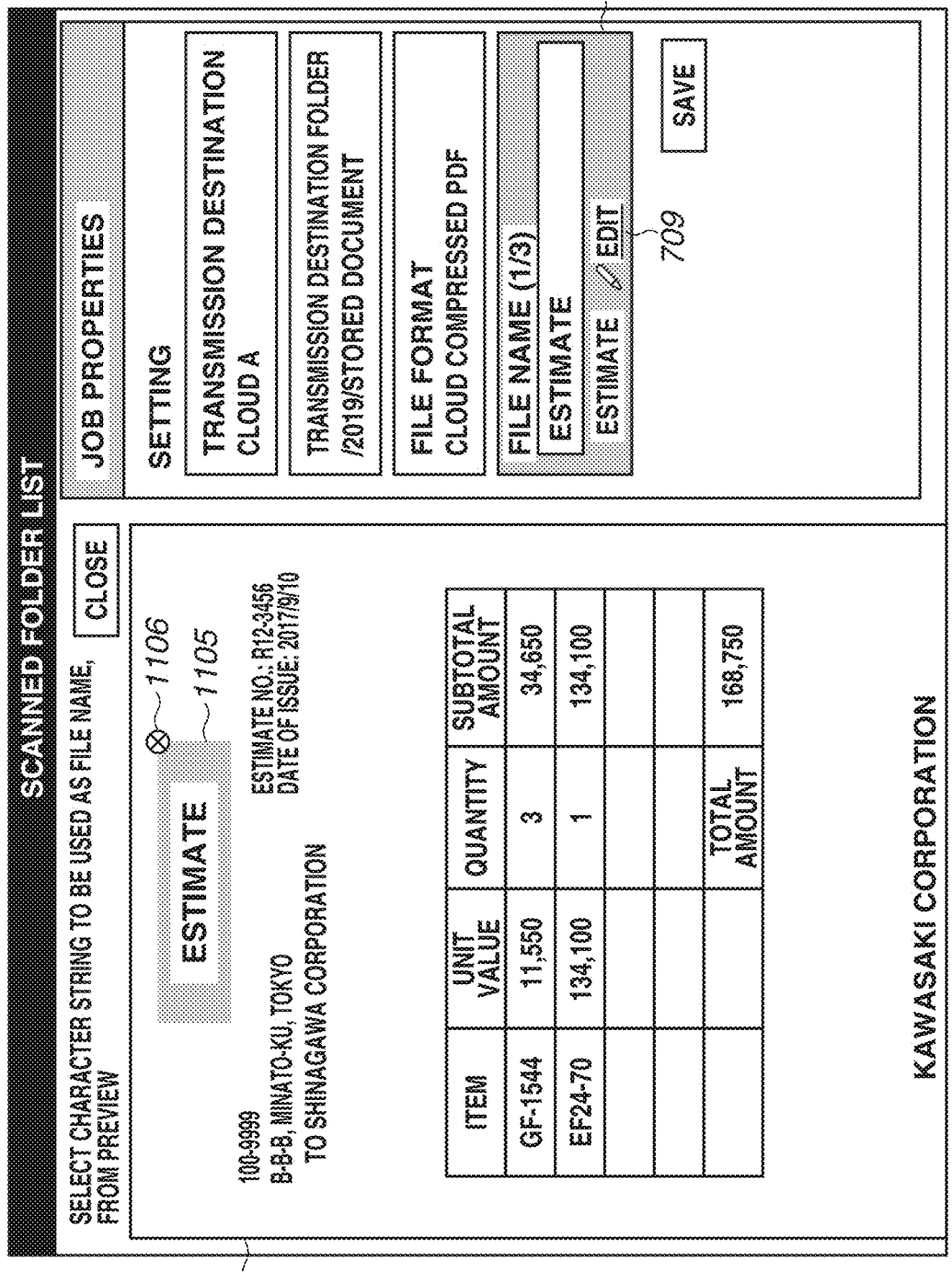

FIG.11D

SCANNED FOLDER LIST | CLOSE

SELECT CHARACTER STRING TO BE USED AS FILE NAME, FROM PREVIEW — 1101

ESTIMATE

ESTIMATE NO.: R12-3456
DATE OF ISSUE: 2017/9/10

100-9999
B-B-B, MINATO-KU, TOKYO
TO SHINAGAWA CORPORATION

| ITEM | UNIT VALUE | QUANTITY | SUBTOTAL AMOUNT |
|---|---|---|---|
| GF-1544 | 11,550 | 3 | 34,650 |
| EF24-70 | 134,100 | 1 | 134,100 |
| | | | |
| | | TOTAL AMOUNT | 168,750 |

KAWASAKI CORPORATION

---

JOB PROPERTIES — 708

SETTING

TRANSMISSION DESTINATION
CLOUD A

TRANSMISSION DESTINATION FOLDER
/2019/STORED DOCUMENT

FILE FORMAT
CLOUD COMPRESSED PDF

FILE NAME (2/3)
ESTIMATE
R12-3456
2017/09/10

ESTIMATE_R12-3456_2017/09/10  ✎EDIT — 709

SAVE

FIG.12

SCANNED FOLDER LIST

| SEND | EDIT | DELETE | | UPDATE |

SCAN JOB | DATE | TRANSMISSION DESTINATION

☑ — NO NAME JOB — | 2019/09/19 19:08 | UNSET
2 PAGES (UNLEARNED)

☐ — NO NAME JOB — | 2019/09/19 19:10 | UNSET
2 PAGES (UNLEARNED)

☐ — NO NAME JOB — | 2019/09/19 19:12 | UNSET
2 PAGES (UNLEARNED)

JOB PROPERTIES

SETTING
CLOUD C
SALES MANAGEMENT/2019 — 1201
CHANGE SETTING — 1202

FILE FORMAT
CLOUD COMPRESSED PDF

FILE NAME
⊕ CLICK TO ADD UP TO 3 OCR BLOCKS
NONE ✎ EDIT

ATTRIBUTE
BILL NUMBER — 1203
⊕ CLICK TO ADD UP TO 3 OCR BLOCKS
NONE ✎ EDIT

DATE — 1204
2019.12.21 ✎ EDIT

SEND — 710

FIG.14

| No | matched | formID | destination | folderPath | outputSetting | fileRegion0 | fileRegion1 | fileRegion2 | duplicateNum | metaData1 | metaData2 | ... | metaDataN |
|---|---|---|---|---|---|---|---|---|---|---|---|---|---|
| 1 | TRUE | aaaaaaaa-ffff-40ab-ac8-55558888eeee | CLOUD A | home/2020/BILL | CLOUD COMPRESSED PDF | 2020/02/01 | BILL | SHIMOMARUKO CORPORATION | | | | | |
| 2 | TRUE | bbbbbbbb-gggg-23ab-ac14-23121111ffff | CLOUD B | home/0345/DRAWING/2020 | TIFF | 2020/02/03 | ABC | WORKING DRAWING | | SUZUKI | 2020/02/03 | | |
| 3 | FALSE | cccccccc-hhhh-89ab-ac5-83719999gggg | | | | | | | | | | | |
| 4 | | | | | | | | | | | | | |
| 5 | | | | | | | | | | | | | |

S1401 → row 1
S1402 → row 2
S1403 → row 3

FIG.19A
SETTING-UNDESIGNATED BUTTON userA 1901

1910:
| formID | destination | folderPath | outputSetting | fileRegion0 | fileRegion1 | fileRegion2 | duplicateNum | metaData1 | metaData2 | ... | metaDataN |
|---|---|---|---|---|---|---|---|---|---|---|---|
| aaaaaaaa-ffff-49ab-acf8-55558888eeee | CLOUD A | home/2020/BILL | CLOUD COMPRESSED PDF | (10, 20,5,10) | (20, 40,5,10) | (50, 70,5,10) | | | | | |

1920:
| formID | destination | folderPath | outputSetting | fileRegion0 | fileRegion1 | fileRegion2 | duplicateNum | metaData1 | metaData2 | ... | metaDataN |
|---|---|---|---|---|---|---|---|---|---|---|---|
| bbbbbbbb-gggg-23ab-acf4-23121111ffff | CLOUD B | home/0345/DRAWING/2020 | TIFF | (5, 20,5,10) | (5, 30,5,10) | (5, 60,5,10) | | (2, 20.5,10) | 2020/02/03 | | |

1901 1902 1903 1904 1905

FIG.19B
SETTING-DESIGNATED BUTTON

1930:
| formID | destination | folderPath | outputSetting | fileRegion0 | fileRegion1 | fileRegion2 | duplicateNum | metaData1 | metaData2 | ... | metaDataN |
|---|---|---|---|---|---|---|---|---|---|---|---|
| aaaaaaaa-ffff-49ab-acf8-55558888eeee | CLOUD C | home/2020/BILL | CLOUD COMPRESSED PDF | (10, 20,5,10) | (20, 40,5,10) | (50, 70,5,10) | | | | | |

SERVER FOR PROVIDING A SETTING SCREEN WITH PREVIOUSLY USED SETTINGS TO A CLIENT APPARATUS FOR IMAGE TRANSMISSION

FIELD OF THE DISCLOSURE

The present disclosure relates to a technique of transmitting image data to a cloud service that provides a service, such as a cloud storage service.

DESCRIPTION OF THE RELATED ART

In recent years, there have been an increasing number of multifunction peripherals (MFPs) cooperating with a cloud service that provides a service, such as a cloud, storage service. For example, an image scanned by an MFP can be transmitted to a cloud service designated by a user. In this case, the user performs data transmission processing after designating a cloud service to which the scanned image is to be transmitted, and setting a file name. Because it is troublesome to set a file name using, for example, a keyboard, Japanese Patent Application Laid-Open No. 2019-041150 discusses a technique for displaying a preview of a scanned image, and using an optical character recognition (OCR) result for a character region selected by the user, for a file name or metadata of the scanned image.

Even if it is possible to save the trouble of setting a file name as discussed in Japanese Patent Application Laid-Open No. 2019-041150, the user is still required to designate a transmission destination cloud and select a character region for setting as a file name, every time scanned image data is transmitted. Thus, the bothersome setting operation has not been improved. The present disclosure is directed to enhancing operability of setting in transmitting scanned image data to a cloud service.

SUMMARY

According to the present disclosure, a Web server that can access a cloud service is characterized by comprising: providing means for providing a setting screen for making a setting regarding transmission target image data, to a client apparatus; transmission means for transmitting the transmission target image data to a cloud service in accordance with a setting regarding the transmission target image data that has been received from a user of the client apparatus on the setting screen; and storage means for storing settings regarding the transmission target image data that have been received from the user on the setting screen, in association with a type of the transmission target image data, wherein, in a case where a setting screen for making a setting regarding new transmission target image data is to be provided, the providing means provides the setting screen for making the setting regarding the new transmission target image data, in a state where a setting, among the settings stored by the storage means, that is stored in association with a type of the new transmission target image data is reflected.

Further features of the present disclosure will become apparent from the following description of exemplary embodiments with reference to the attached drawings.

BRIEF DESCRIPTION OF THE DRAWINGS

FIGS. 5A and 5B are sequence diagrams illustrating processing flows performed between devices.

FIG. 7 illustrates an example of a scanned form list screen displayed by a client PC.

FIG. 8 illustrates an example of a transmission destination cloud storage service edit screen displayed by the client PC.

FIGS. 11A, 11B, 11C and 11D illustrate an example of an edit screen displayed by the client PC.

FIG. 12 illustrates an example of a scanned form list screen displaying metadata displayed by the client PC.

FIG. 14 illustrates an example of partial saved data of analysis result information performed by the MFP cooperation service in the present system.

FIGS. 19A and 19B each illustrate an example of a management structure of learning data stored by the MFP cooperation service in the present system.

DESCRIPTION OF THE EMBODIMENTS

Hereinafter, an exemplary embodiment of the present disclosure will be described with reference to the drawings. The following exemplary embodiment is not intended to limit the scope of the invention set forth in the appended claims. Not all the combinations of features described in the exemplary embodiment are essential to the solution of the invention.

First Exemplary Embodiment

<Overall Configuration>

Figure 1:
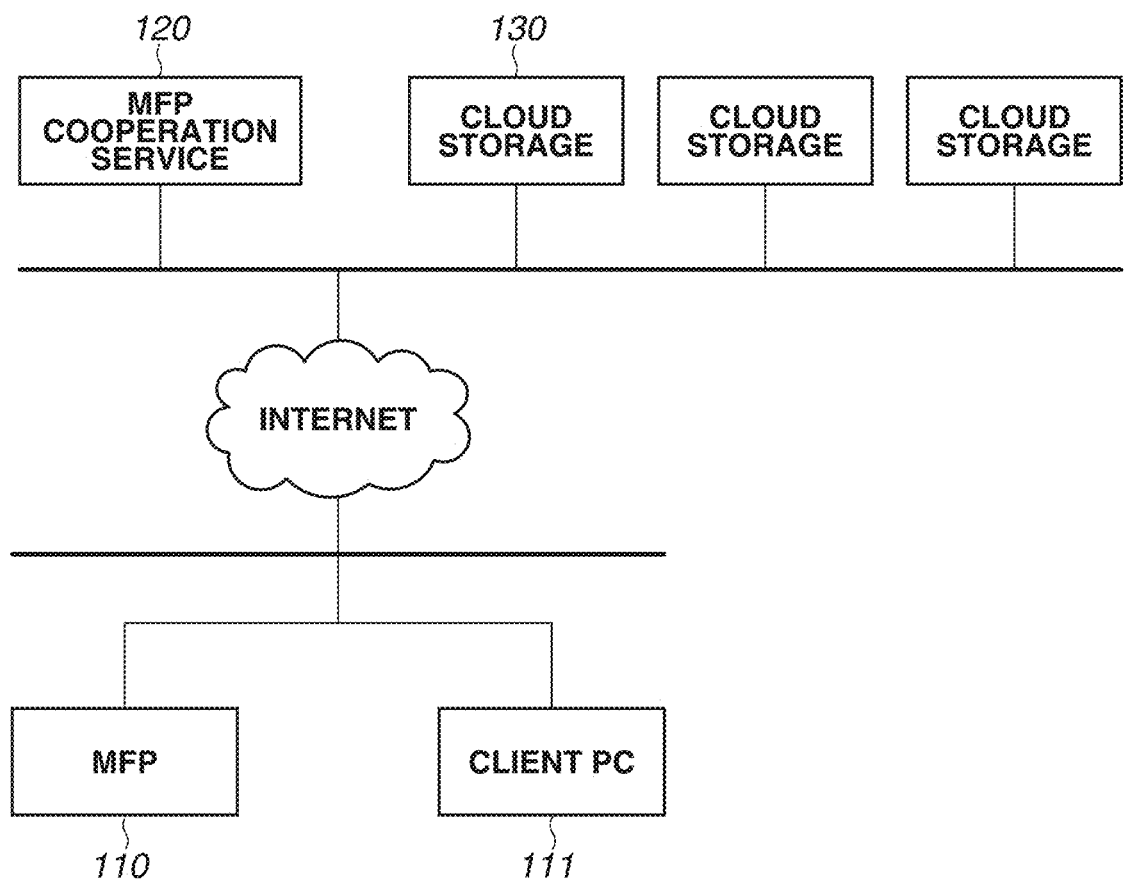
FIG. 1 is a diagram illustrating an overall configuration of a present system.

FIG. 1 is a diagram illustrating the overall configuration of a present system. An image processing system includes a multifunction peripheral (MFP) 110, a client personal computer (PC) 111, an MFP cooperation service 120, and a cloud storage 130. The MFP 110 and the client PC 111 are connected via a local area network (LAN) to a server on the Internet that provides various services, in such a manner that communication can be performed.

The MFP 110 is a multifunction peripheral having a plurality of functions, such as a scanner and a printer, and serves as an example of an image forming apparatus.

The client PC 111 is an information processing apparatus to be provided with a service designated by a request issued to the MFP cooperation service 120.

The MFP cooperation service (Web server) 120 serves as an example of a service having a function of saving an image file scanned by the MFP 110, into a server of the MFP cooperation service 120, or transferring the scanned image file to a service, such as another storage service, that can save files.

The cloud storage (service) 130 is a service that enables a file received via the Internet, to be saved, and enables an external apparatus to acquire a file via a Web browser. The cloud storage is not limited to the cloud storage 130, and a plurality of cloud storages exists.

The image processing system according to the present exemplary embodiment has a configuration including the MFP 110, the client PC 111, the MFP cooperation service 120, and the cloud storage 130, but the configuration is not limited to this. For example, the MFP 110 may also have a function of the client PC 111 or the MFP cooperation service 120. Further, the MFP cooperation service 120 may be arranged on a server on a LAN instead of being connected onto the Internet. The cloud storage 130 may also be replaced with an e-mail server that transmits a scanned image by attaching the scanned image to an e-mail.

<Hardware Configuration of MFP>

Figure 2:
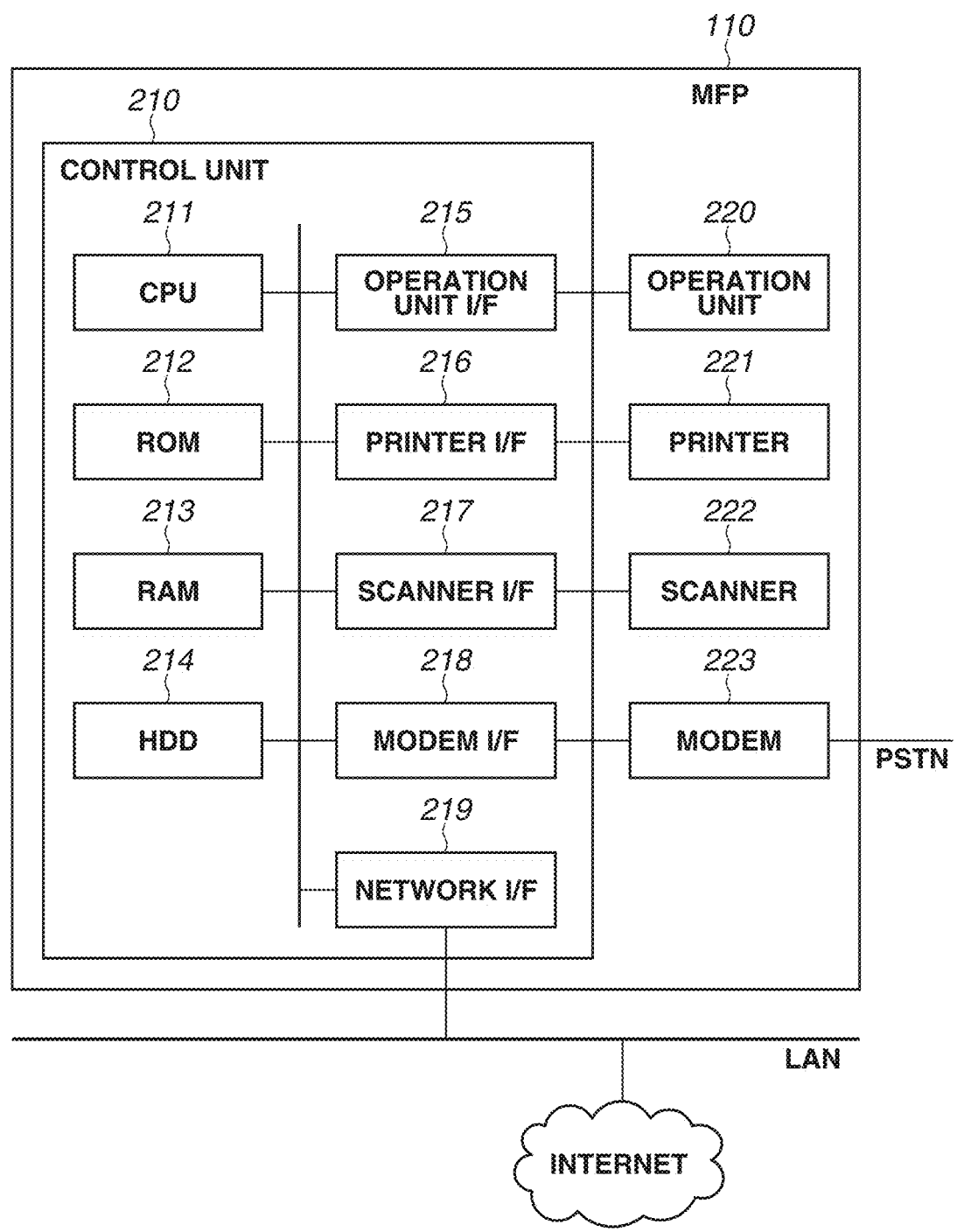
FIG. 2 illustrates a hardware configuration of a multifunction peripheral (MFP).

FIG. 2 illustrates a hardware configuration of the MFP 110.

The MFP 110 includes a control unit 210, an operation unit 220, a printer unit 221, a scanner unit 222, and a modem 223.

The control unit 210 includes the following components 211 to 219, and controls operations of the entire MFP 110.

The central processing unit (CPU) 211 reads out a control program stored in the read-only memory (ROM) 212, and executes/controls various functions included in the MFP 110, such as reading, printing, and communication functions.

The random access memory (RAM) 213 is used as a main memory of the CPU 211 and a temporary storage region, such as a work area. In the present exemplary embodiment, one CPU 211 executes each piece of processing illustrated in the following flowchart, using one memory (the RAM 213 or the hard disc drive (HDD) 214), but the control configuration is not limited to this. For example, a plurality of CPUs may cooperatively execute each piece of processing using a plurality of RAMs or HDDs in cooperation.

The HDD 214 is a large-volume storage unit that stores image data and various programs.

The operation unit interface (I/F) 215 is an interface that connects the operation unit 220 and the control unit 210.

The operation unit 220 includes a touch panel and a keyboard, and receives an operation/input/instruction generated by the user.

The printer I/F 216 is an interface that connects the printer unit 221 and the control unit 210. Image data for printing is transferred from the control unit 210 to the printer unit 221 via the printer I/F 216, and is printed onto a recording medium.

The scanner I/F 217 is an interface that connects the scanner unit 222 and the control unit 210.

The scanner unit 222 generates image data by reading a document set on a platen (not illustrated) or an auto document feeder (ADF) (not illustrated), and inputs the generated image data to the control unit 210 via the scanner I/F 217.

The MFP 110 can print (copy) the image data generated by the scanner unit 222 with the printer unit 221, and also transmit the image data as a file or via e-mail.

The modem I/F 218 is an interface that connects the modem 223 and the control unit 210.

The modem 223 performs facsimile communication of image data with a facsimile apparatus on a public switched telephone network (PSTN).

The network I/F 219 is an interface that connects the control unit 210 (the MFP 110) to a LAN.

Using the network I/F 219, the MFP 110 transmits image data or information to each service on the Internet and receives various types of information therefrom, <Hardware Configuration of Client PC and MFP Cooperation Service (Server)>

Figure 3:
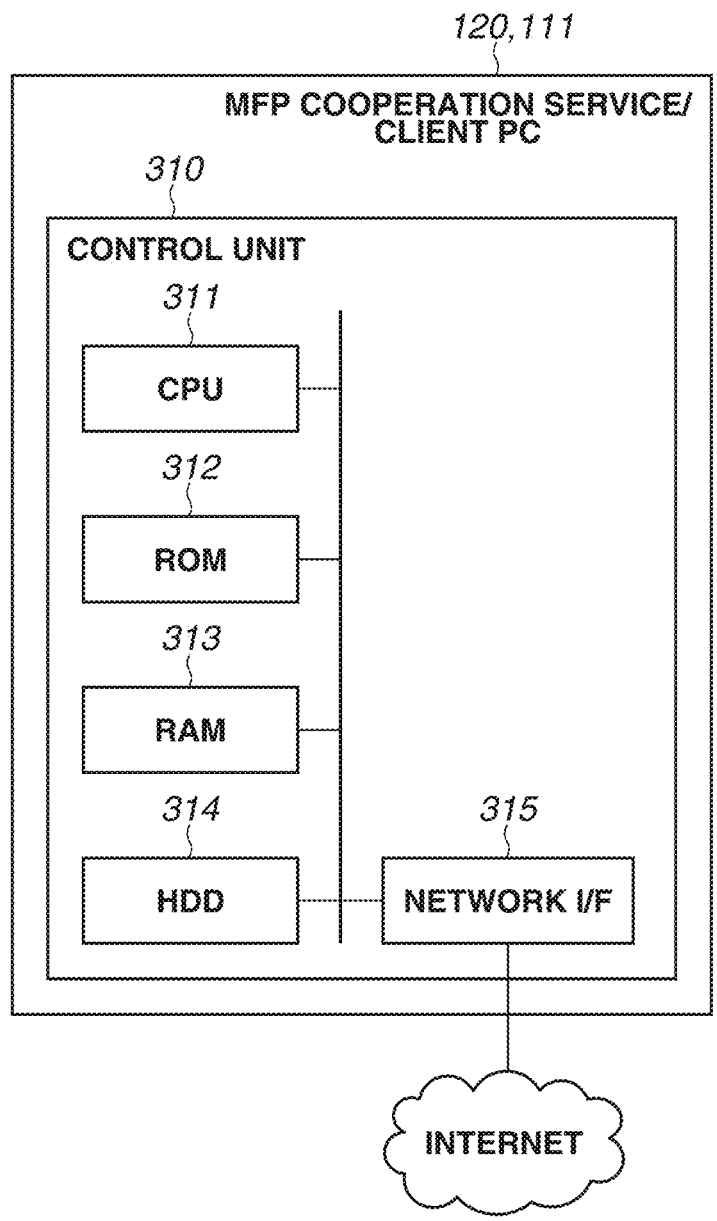
FIG. 3 illustrates a hardware configuration of a client personal computer (PC) and an MFP cooperation service.

FIG. 3 illustrates a hardware configuration of the client PC 111 and the MFP cooperation service 120.

A control unit 310 of the client PC 111 and the MFP cooperation service 120 includes a CPU 311, a ROM 312, a RAM 313, an HDD 314, and a network I/F 315.

The CPU 311 controls operations of the entire apparatus by executing various types of processing by reading out a control program stored in the ROM 312.

The RAM 313 is used as a main memory of the CPU 311, and a temporary storage region, such as a work area.

The HDD 314 is a large-volume storage unit that stores image data and various programs.

The network I/F 315 is an interface that connects the MFP cooperation service 120 to the Internet.

The MFP cooperation service 120 and the client PC 111 receive a processing request from another apparatus (e.g., the MFP 110) via the network I/F 315, and transmit/receive various types of information.

<Software Configuration of Image Processing System>

Figure 4:
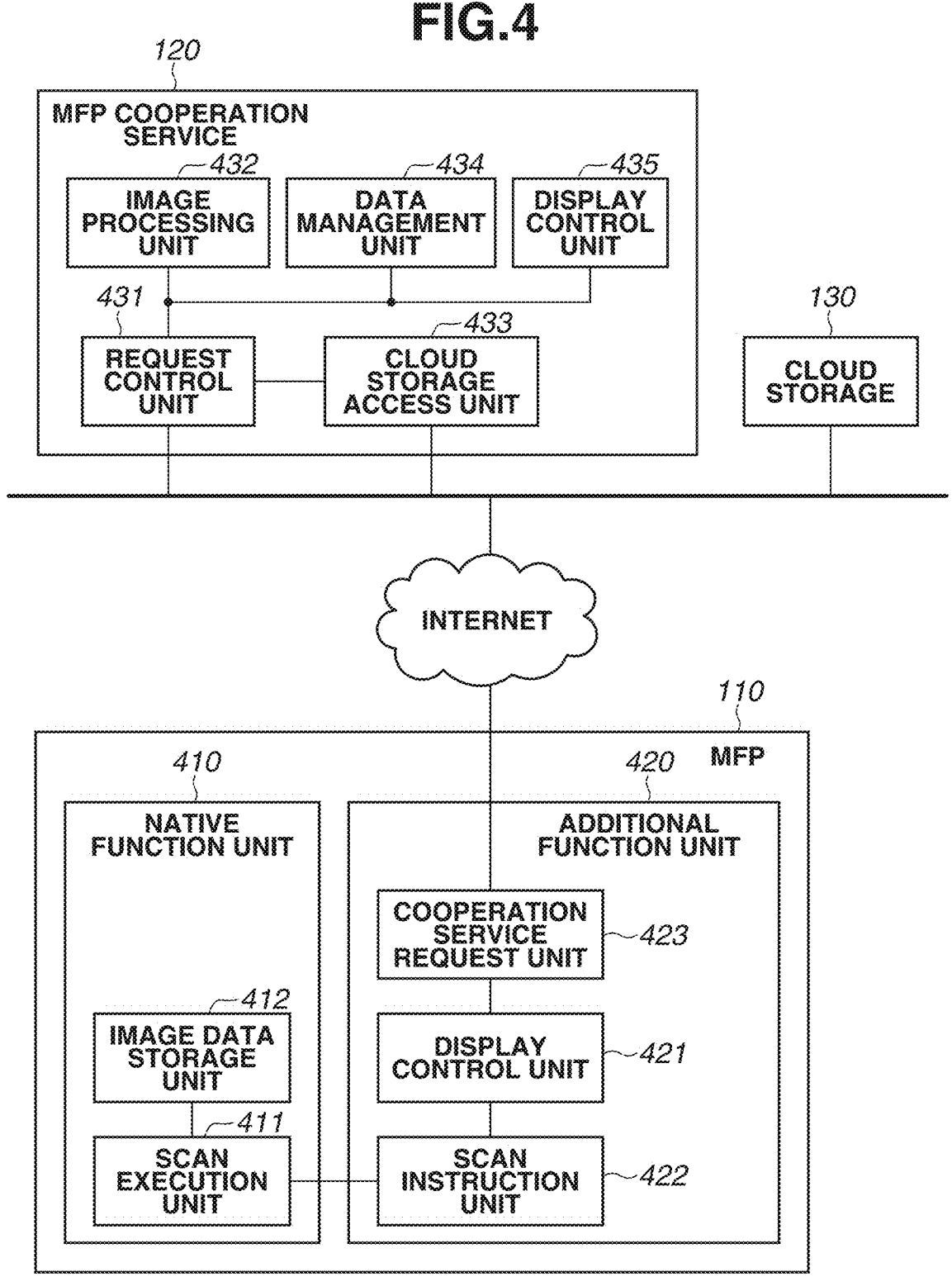
FIG. 4 illustrates a software configuration of the present system.

FIG. 4 illustrates a software configuration of the image processing system according to the present exemplary embodiment.

The MFP 110 is broadly divided into two software components corresponding to a native function unit 410 and an additional function unit 420. Each function unit is implemented by the CPU 211 loading a program stored in the ROM 212 or the HDD 214 of the MFP 110, onto the RAM 213, and executing the program.

While components included in the native function unit 410 are included in the MF 110 as standard, the additional function unit 420 is an application additionally installed on the MFP 110.

The additional function unit 420 is an application based on Java®, and the additional function unit 420 can easily add a function to the MFP 110. Another additional application (not illustrated) may be installed on the MFP 110.

The native function unit 410 includes a scan execution unit 411 and an image data storage unit 412. The additional function unit 420 includes a display control unit 421, a scan instruction unit 422, and a cooperation service request unit 423.

The display control unit 421 displays, on a liquid crystal display unit of the operation unit 220 of the MFP 110 that has a touch panel function, a user interface (UI) screen for receiving an operation performed by the user. For example, the display control unit 421 displays an operation screen for receiving the entry of authentication information for accessing the MFP cooperation service 120, a scan setting, and an operation of a scan start.

The scan instruction unit 422 transmits a scan processing request to the scan execution unit 411 using a scan setting conforming to a user instruction issued via the UI screen.

The scan execution unit 411 receives the scan processing request including the scan setting, from the scan instruction unit 422. The scan execution unit 411 generates, in accordance with the scan processing request, scan image data by reading a document placed on a platen glass with the scanner unit 222 via the scanner T/F 217. The generated scan image data is transmitted to the image data storage unit 412.

The scan execution unit 411 transmits a scan image identifier uniquely indicating stored scan image data, to the scan instruction unit 422. The scan image identifier includes a number, a symbol, and an alphabet (not illustrated) for uniquely identifying a scanned image in the MFP 110. The image data storage unit 412 stores the scan image data received from the scan execution unit 411, into the HDD 214.

The scan instruction unit 422 acquires, from the image data storage unit 412, scan image data corresponding to the scan image identifier received from the scan execution unit 411. The scan instruction unit 422 requires the cooperation service request unit 423 to issue an instruction for processing the acquired scan image data in the MFP cooperation service 120.

The cooperation service request unit 423 issues a request for various types of processing to the MFP cooperation service 120. Examples of the request include login and scan image analysis. A protocol, such as representational state transfer (REST) or a simple object access protocol (SOAP), is used for communication with the MFP cooperation service 120, but another communication method may be used.

The MFP cooperation service 120 includes a request control unit 431, an image processing unit 432, a cloud storage access unit 433, a data management unit 434, and a display control unit 435.

The request control unit 431 stands by in a state in which the request control unit 431 can receive a request from an external apparatus. When the request control unit 431 receives a processing request, the request control unit 431 instructs the image processing unit 432, the cloud storage access unit 433, or the data management unit 434 to execute processing based on the processing request. For example, the request control unit 431 issues an instruction for performing login processing, in accordance with a login request from the MFP 110.

The image processing unit 432 performs image recognition processing or image processing, such as analysis of a character region in image data, optical character recognition (OCR), similar form determination (described below in processing of step S516 in FIG. 5A), and rotation or inclination correction of an image.

The cloud storage access unit 433 transmits a processing request to a cloud service that provides a function (storage service) of a cloud storage. The cloud service releases various interfaces to the public for storing a file into a cloud storage or acquiring a stored file from an external apparatus, using a protocol, such as the REST or the SOAP, in general. The cloud storage access unit 433 performs an operation of the cloud storage using the released interfaces of the cloud storage.

The data management unit 434 holds user information and various types of setting data that are managed by the MFP cooperation service 120.

The display control unit 435 receives a request from a Web browser operating on another terminal (not illustrated), such as a PC or a mobile terminal connected via the Internet, and returns screen configuration information (e.g., HyperText Markup Language (HTML), and cascading style forms (CSS)) used for screen display. The user checks user information registered in the MFP cooperation service 120 or changes a scan setting, via a screen displayed on the Web browser.

Referring to FIG. 4, the description has been given of an example of a configuration for installing the additional function unit 420 onto the MFP 110. However, the present exemplary embodiment is not limited to this configuration. For example, the function of the additional function unit 420 can be included in the client PC 111.

<Overall Processing Flow>

FIGS. 5A and 5B are sequence diagrams each illustrating a processing flow performed between the apparatuses when the MFP 110 converts a scanned image into a file and transmits the file to a cloud storage. FIG. 5A is a sequence diagram illustrating processing for the user scanning a form using a scan application in the MFP 110, and transmitting form data to the MFP cooperation service 120. FIG. 5B is a sequence diagram illustrating processing for browsing and operating the form data transmitted to the MFP cooperation service 120, on the client PC 111, and transmitting the form data to the cloud storage 130. The communication performed between the apparatuses will be mainly described.

The MFP 110 displays, on the touch panel, a main screen on which buttons for executing functions to be provided are arranged.

By installing an additional application (hereinafter, referred to as a scan application) for transmitting a scanned form to a cloud storage, a button for using the function of the application is displayed on the main screen of the MFP 110. When this button is pressed, a screen used for transmitting a scanned form to the MFP cooperation service 120 is displayed.

In step S501, the MFP 110 displays a login screen (not illustrated) for entering authentication information for accessing the MFP cooperation service 120.

In step S502, the user enters a user name and a password used for login, and the MFP 110 transmits a login request to the MFP cooperation service 120.

In step S503, the MFP cooperation service 120 verifies whether the user name and the password included in the login request are correct, and returns an access token to the MFP 110 if the user name and the password are correct. In the following processing, various requests to be issued from the MFP 110 to the MFP cooperation service 120 include the access token, and a user to be subjected to processing can be identified based on the information of the token. As a user authentication method, a known method (e.g., basic authentication, digest authentication, authentication using open authentication (OAuth)) is used in general.

If the login processing has been completed, in step S504, the MF 110 displays applications that can be used by the MFP 110, on the main screen (not illustrated).

If the user presses a scan application button on the main screen, in step S505, the MFP 110 transmits a scan application activation request to the MFP cooperation service 120.

The MFP cooperation service 120 acquires, from the HDD 314 of the MFP cooperation service 120, information used for displaying a button selection screen of scan processing executable by a login user, and transmits the acquired information to the MFP 110. In step S506, the MFP 110 displays a scan button selection screen illustrated in FIG. 6A, based on the information received from the MFP cooperation service 120.

Figure 6A:
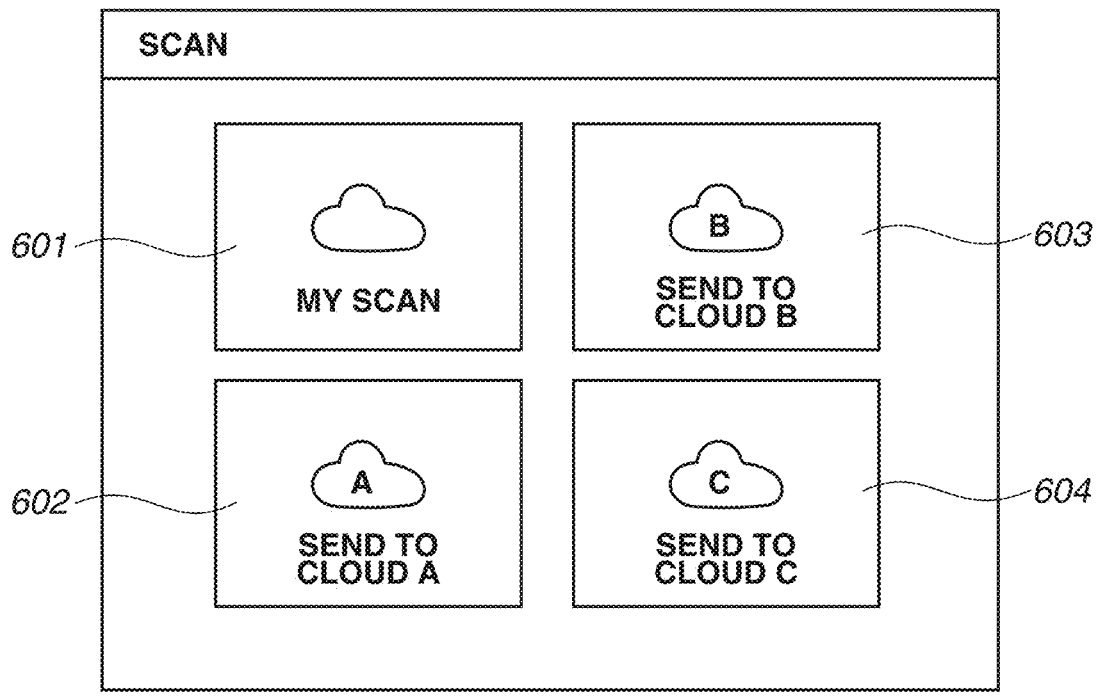
FIGS. 6A and 6B each illustrate an example of a screen displayed by the MIT.

Buttons 601 to 604 illustrated in FIG. 6A are buttons that can be used by the login user, among scan buttons registered in the MFP cooperation service 120.

There are two types of scan buttons. One of the types corresponds to the button 601 (hereinafter, referred to as a setting-undesignated button) for setting, for example, a transmission destination cloud service or a transmission destination folder of scanned data, an output setting, and a file name from the client PC 111. The other of the types corresponds to the buttons 602, 603, and 604 (hereinafter, referred to as setting-designated buttons) for presetting a transmission destination cloud service or a scan setting in the MFP cooperation service 120.

For the setting-designated buttons 602 to 604, a user or an administrator of the MFP 110 is required to register a required number of buttons corresponding to required combinations of settings, in the MF cooperation service 120.

There is no need for the setting-undesignated button 601 to preset a setting in the MFP cooperation service 120, and therefore one setting-undesignated button 601 is displayed for each user.

Thus, even if the administrator has not pre-registered a button in the MFP cooperation service 120, the user can use the function of the scan application. The user can also specify, after scanning, a setting desired by the user, without resorting to the administrator.

In the present exemplary embodiment, the detailed description will be given below assuming that the user uses the setting-undesignated button 601.

If the user selects the setting-undesignated button 601, in step S507, the MFP 110 transmits a request for a scan setting set by default for the setting-undesignated button 601, to the MFP cooperation service 120.

In response to the scan setting request, the MFP cooperation service 120 acquires, from the HDD 314 of the MF cooperation service 120, the default scan setting set for the setting-undesignated button 601 and information used for displaying a scan setting screen, and transmits the acquired information to the MFP 110.

Figure 6B:
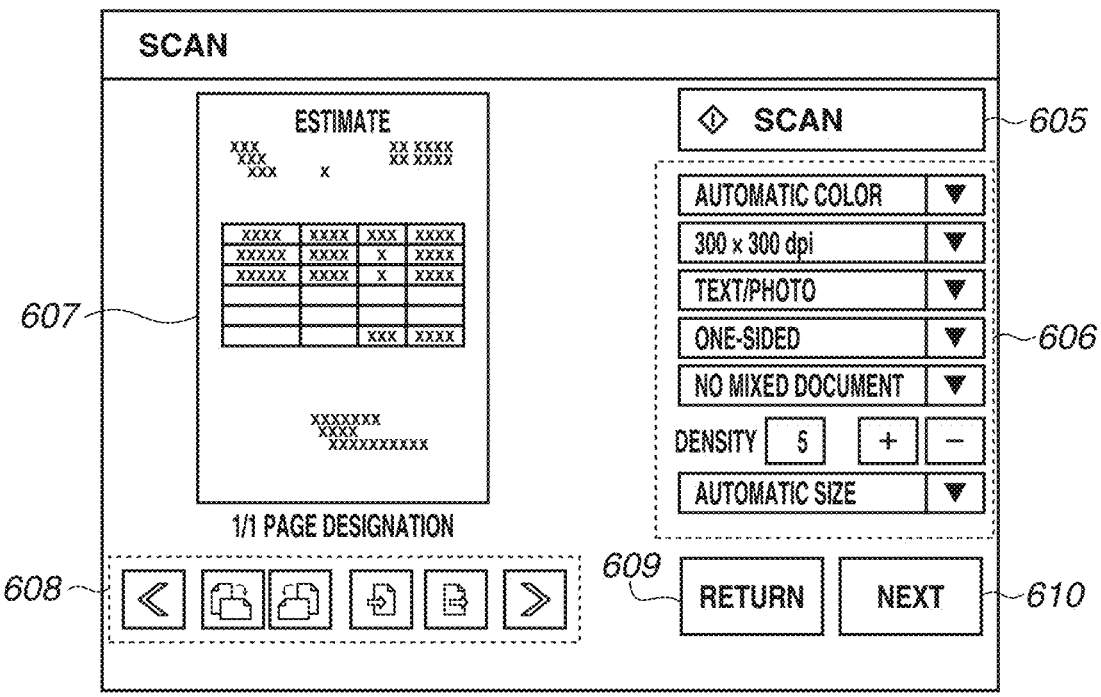

In step S508, the MFP 110 displays a scan setting screen illustrated in FIG. 6B, based on the received information. A button 605 is a button for executing scan. A region 606 is a region for receiving a change for a scan setting, such as color, resolution, image quality, duplex printing, document size mixed, density, and a document size. A preview of a scanned document is displayed in a region 607. A button 608 is a button for performing page feed of the displayed preview, page rotation, page deletion, and page addition (additional scan). A button 609 is a button for returning to the scan button selection screen.

If various scan settings regarding reading are made, a paper form to be scanned is placed on a platen glass or an ADF, and the "scan" button 605 is pressed, in step S509, the MFP 110 executes scan, and image data obtained by computerizing the paper form is generated. A button 610 is a button for advancing the scanned data to the next processing.

When the "next" button 610 is pressed, in step S510, the MFP 110 displays a scan processing in-progress screen.

In step S511, the MFP 110 transmits a scan image analysis request to the MFP cooperation service 120 together with the image generated in the scan processing performed in step S509.

The scan image received by the MFP cooperation service 120 is held in the HDD 314 of the MFP cooperation service 120 until the scan image is transmitted to the cloud storage.

When the MFP cooperation service 120 receives the scan image analysis request from the MFP 110, in step S512, the image processing unit 432 of the MFP cooperation service 120 starts image analysis.

Thereafter, the MFP cooperation service 120 returns "processId", which is an identifier uniquely indicating analysis requested to be performed by the MFP cooperation service 120, to the MFP 110 without waiting for the end of image analysis processing. Then, the MFP cooperation service 120 receives a processing status check request in step S513.

In the image analysis processing, in step S514, the MFP cooperation service 120 analyzes a character region existing in the image, and in step S515, performs character recognition processing on all character regions.

In step S516, the MFP cooperation service 120 compares, using arrangement information of character regions in a form, arrangement information of images scanned in the past by the user who has logged in the MFP cooperation service 120 in step S503, and arrangement information of the image scanned this time, and determines whether an image having similar character region arrangement has been scanned. This processing is referred to as similar form determination.

In a case where it is determined, in the similar form determination, that a target scan image is similar to an image scanned in the past, the MFP cooperation service 120 saves the target scan image into the HDD 314 of the MFP cooperation service 120 after allocating information indicating setting information set for the image similar to the target scan image. In a case where there is no image similar to the target scan image, the MFP cooperation service 120 saves information regarding character regions in the entire scanned image, and information indicating that there is no similar image.

The information regarding the past scan images used in this determination is saved and accumulated in association with a user by the processing in steps S534, S540, and S543 described below.

The details of the processing in steps S514 to S516 will be described with reference to FIG. 13.

In step S517, the MFP 110 periodically (e.g., approximately every several hundreds of milliseconds to every several milliseconds) transmits a processing status check request for image analysis corresponding to a "processId", to the MFP cooperation service 120 using the "processId" received as a response in step S511. The processing in step S517 is continuously performed until a response indicating image processing completion is acquired from the MFP cooperation service 120, which is not illustrated in FIG. 5A. If the MFP cooperation service 120 receives a processing status check request, the MFP cooperation service 120 checks a processing status corresponding to the "processId" received as a response in step S511, and returns a response indicating the processing status.

A character string indicating the current processing status is stored as a "status" in the response. For example, when the "status" indicates "processing", the "status" indicates that the processing is in progress in the MFP cooperation service 120, and when the "status" indicates "completed", the "status" indicates a completed state of the processing. Another status, such as "failed", is sometimes returned when the processing has failed.

If the MFP 110 detects the completion of the processing in step S517, in step S518, the MFP 110 displays a message indicating that the scan has been completed, on a screen of the MFP 110, and the processing returns to the scan setting screen displayed in step S508. If there is a plurality of forms to be scanned, the plurality of forms can be repetitively scanned (the processing in steps S508 to S518 can be repeatedly performed). In addition, by issuing an instruction for making a setting of dividing a scanned document into a fixed number of pages using divider paper, before scanning, it is possible to collectively scan a plurality of forms at one time and divide the scanned forms into a plurality of forms.

After step S518, the user sets a transmission destination cloud storage, a transmission destination folder, an output setting, a file name, and metadata of the form generated by scanning, and performs processing of transmitting the settings to the cloud storage (service) 130 with the client PC 111. When accessing the MFP cooperation service 120 from the client PC 111, the user performs login processing (not illustrated in FIG. 5B) similarly to the login processing of the MFP 110, and the user performs the processing on a scanned form scanned by the user.

In step S519 of FIG. 5B, the client PC 111 acquires, from the MFP cooperation service 120, a scanned form list screen for checking a scanned form list, and displays the scanned form list screen.

FIG. 7 illustrates an example of a scanned form list screen to be displayed by the client PC 111.

Data 701 to 703 are data of forms scanned by the user using the MFP 110.

An area 704 is an area for displaying information (hereinafter, referred to as job properties) set for a scanned form selected on the scanned form list screen.

A button 705 is a button for displaying a screen for setting a transmission destination cloud storage service.

A button 706 is a button for displaying a screen for setting a transmission destination folder in the transmission destination cloud storage service, after the transmission destination cloud storage service is set using the button 705.

A button 707 is a button for displaying a screen for setting an output setting, such as a storage file format used when a scan form is stored.

A button 708 is a button for displaying an edit screen for setting a file name using a character included in a preview image of a scanned form.

A button 709 is a button for setting a file name by directly entering text.

A button 710 is a button for saving the settings or sending a scanned form to a set transmission destination, after required settings are completed. In accordance with the content of the settings, a button name of the button 710 is switched to "save" or "send". If settings required for saving or sending are not made, the button 710 is displayed in a disabled state.

A button 711 is a button for sending a scanned form.

A button 712 is an edit button for displaying an edit screen. The edit screen is a screen for selecting a character string in a preview image of a scanned form and entering the selected character string, and the edit screen is used for the entry of a file name or the entry of metadata, which will be described below.

A button 713 is a button for deleting data of a selected scan form.

A button 714 is a list refresh button that enters an enabled state if the MFP cooperation service 120 holds a scanned form that has not been displayed. By clicking the button 714, the scanned form list screen is refreshed and all the scanned forms currently held in the MFP cooperation service 120 are displayed.

A tag 715 is a tag to be displayed if it is determined in the similar form determination that there is no form similar to a scanned form. Since there is no form similar to a form corresponding to the data 701 in this example, there is no learning data and thus "unlearned" is displayed. In FIG. 7, a scanned form corresponding to the data 701 is selected, and job properties of the scanned form corresponding to the data 701 are displayed in the area 704. Since "unlearned" is displayed as the tag 715, the user can see that a form similar to the form indicated by the data 701 has never been scanned. If a similar form has ever been scanned, settings made by the user in the past for the similar form are reflected in the settings of the job properties in the area 704. Nevertheless, since there is no similar form in this example, default values are displayed in the setting buttons of the job properties in the area 704. In this example, a transmission destination cloud service is unset, a transmission destination folder is also unset, "cloud compressed. PDF" is displayed as a default value of an output setting, and "none" is displayed as a default value of a file name. In this manner, as for a form having no similar form (unlearned form) among forms scanned using the setting-undesignated button, a setting, such as a transmission destination cloud storage service can be individually set afterward.

First of all, if the user clicks the transmission destination button 705, in step S520, the client PC 111 transmits a transmission destination edit screen request to the MFP cooperation service 120. Then, the client PC 111 receives screen information from the MFP cooperation service 120, and displays a transmission destination setting screen illustrated in FIG. 8.

Information regarding a scanned form is displayed in an area 801 in such a manner that the setting target scanned form can be identified. Selectable cloud storages 130 are displayed in an area 802. A button 803 is a button for saving a selected cloud storage 130 as a transmission destination.

If the user selects one cloud storage service from the area 802 and clicks the save button 803, in step S521, the client PC 111 transmits information regarding the selected transmission destination to the MFP cooperation service 120.

In step S522, the MFP cooperation service 120 checks whether the user can access the selected cloud storage 130. If authentication information used for the user accessing the cloud storage 130 is stored in the MFP cooperation service 120, the MFP cooperation service 120 saves the received cloud storage 130 as a transmission destination for the scanned form. If authentication information required for the user to access the cloud storage 130 is not stored in the MFP cooperation service 120, the MFP cooperation service 120 displays a message indicating that authentication is required for accessing the cloud storage 130. Thereafter, the MFP cooperation service 120 displays a login screen of the cloud storage 130. If the user logs into the cloud storage 130, the MFI cooperation service 120 saves authentication information used for connecting to the cloud storage 130, into the MFP cooperation service 120. After checking the connection, the MFP cooperation service 120 saves the selected cloud storage 130 as a transmission destination of the scanned form.

If the processing in step S523 is completed, the client PC 111 displays the scanned form list screen illustrated in FIG. 7, in a state in which information regarding a set transmission destination cloud storage service is updated. The column in the data 701 that displays a transmission destination cloud storage service and the content set in the button 705 are reflected. At this time, if the cloud storage 130 selected as a transmission destination is a cloud storage service that does not have metadata information, the button name of the button 710 is changed from "save" to "send". If the selected cloud, storage 130 is a cloud storage service that has metadata information, the button name of the button 710 remains to be "save". If the setting of a transmission destination is completed by using the button 705, the transmission destination folder setting button 706 changes from a disabled state to an enabled state.

When the user clicks the button 706, in step S524, the client PC 111 transmits a transmission destination folder edit screen request to the MFP cooperation service 120.

In step S525, the MFP cooperation service 120 acquires folder information from the cloud storage 130 using the authentication information for the user accessing the cloud storage 130. Thereafter, the MFP cooperation service 120 transmits a transmission destination folder edit screen on which the acquired folder information is displayed, to the client PC 111, and the client PC 111 displays the transmission destination folder edit screen.

Figure 9:
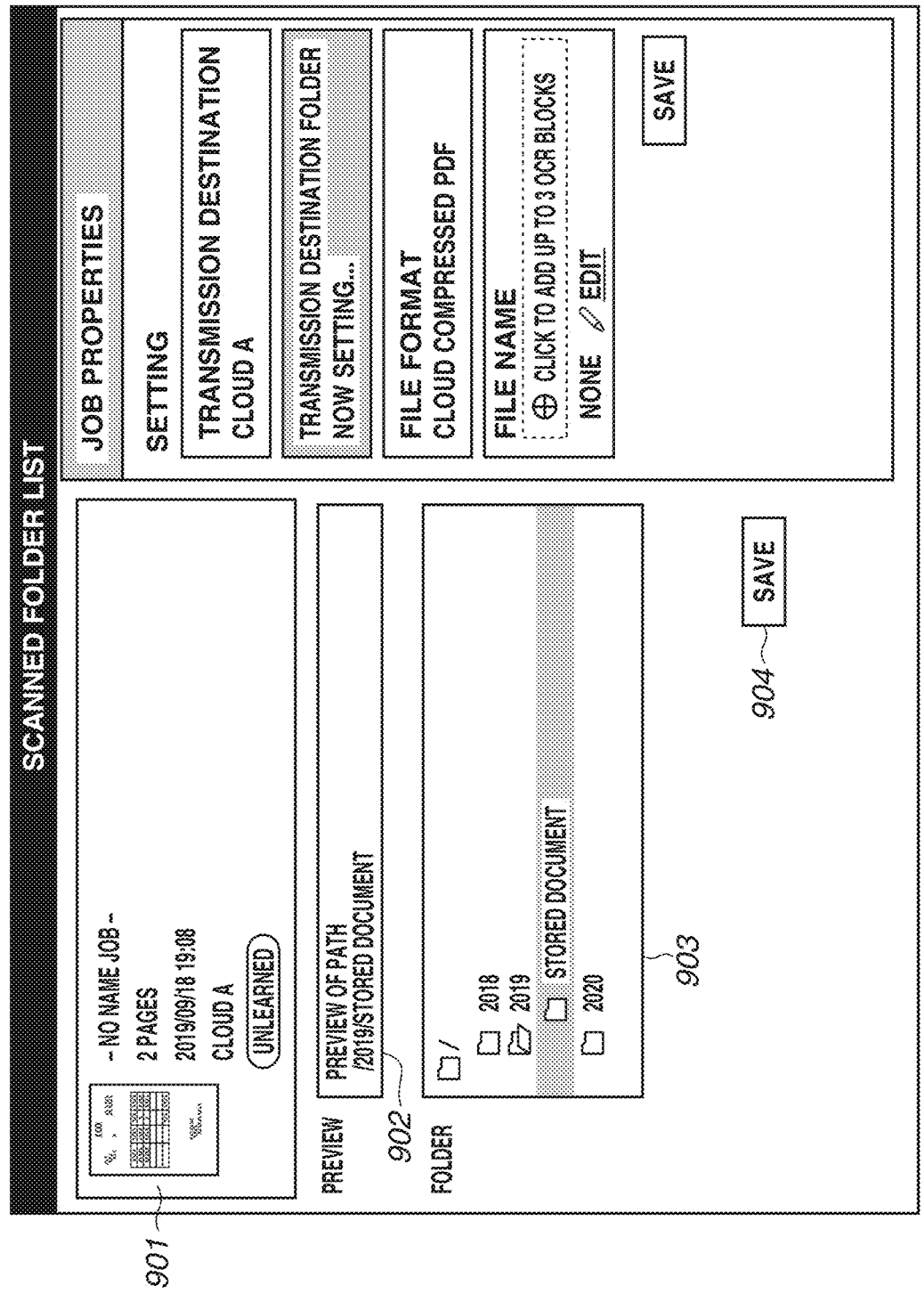
FIG. 9 illustrates an example of a transmission destination folder edit screen displayed by the client PC.

FIG. 9 illustrates the transmission destination folder edit screen. An edit target scanned form is displayed in an area 901 similarly to the area 801.

A path of a transmission destination folder being selected is displayed as a preview in an area 902.

Folder information acquired from the cloud storage 130 is displayed in an area 903 as a tree view.

The user selects a transmission destination folder by clicking a folder displayed in the area 903.

A button 904 is a button for saving the selected folder as a transmission destination folder.

If the user designates a folder in the area 903 and clicks the save button 904, in step S526, the client PC 111 transmits information regarding the transmission destination folder selected by the user, to the MFP cooperation service 120.

In step S527, the MFP cooperation service 120 saves the received transmission destination folder as a transmission destination folder of the scanned form. The MFP cooperation service 120 transmits a screen with the updated transmission destination folder, to the client PC 111.

The client PC 111 displays the scanned form list screen illustrated in FIG. 7 that includes the updated transmission destination folder. At this time, if the settings have been made using the buttons 705 to 707, and the transmission destination of the button 705 is the cloud storage 130 having metadata, the "save" button 710 changes from a disabled state to an enabled state.

If the user clicks the button 707, in step S528, the client PC 111 transmits an output setting edit screen request to the MFP cooperation service 120. The MFP cooperation service 120 transmits an output setting edit screen to the client PC 111, and the client PC 111 displays the output setting edit screen.

Figure 10:
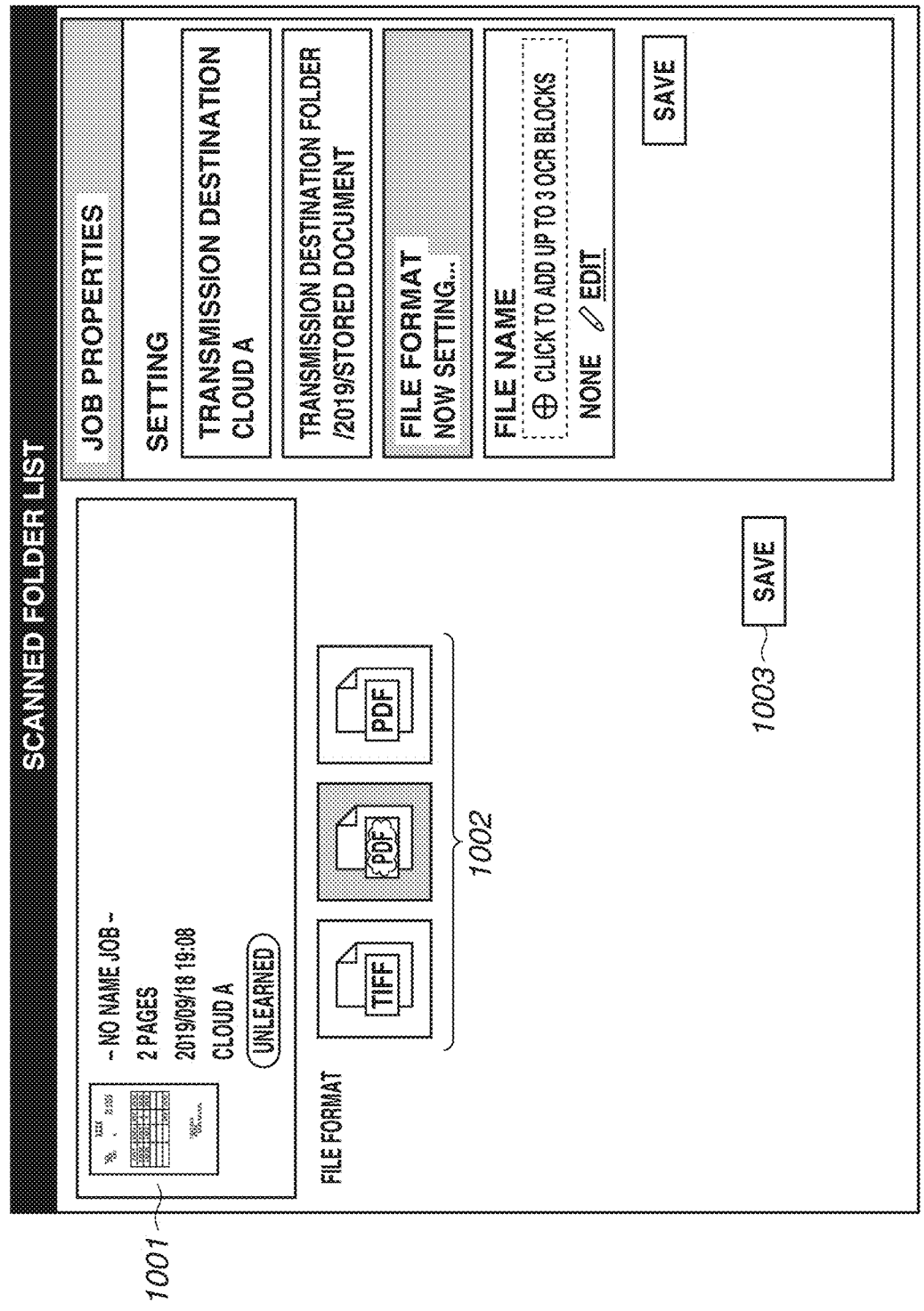
FIG. 10 illustrates an example of an output setting edit screen t displayed by the client PC.

FIG. 10 illustrates an example of the output setting edit screen. Information regarding an edit target scanned form is displayed in an area 1001 similarly to the areas 801 and 901. Selectable output settings are displayed in an area 1002. In this example, storage file formats are displayed, and a cloud compressed PDF is in a selected state as a default value.

If the user selects an output setting from the area 1002 and clicks a save button 1003, in step S529, the client PC 111 transmits information regarding the output setting selected by the user, to the MFP cooperation service 120. The MFP cooperation service 120 saves the received output setting as an output setting of the scanned form, and transmits information used for displaying the updated screen, to the client PC 111.

The client PC 111 displays the scanned form list screen illustrated in FIG. 7 in which the output setting is updated.

Figure 11C:
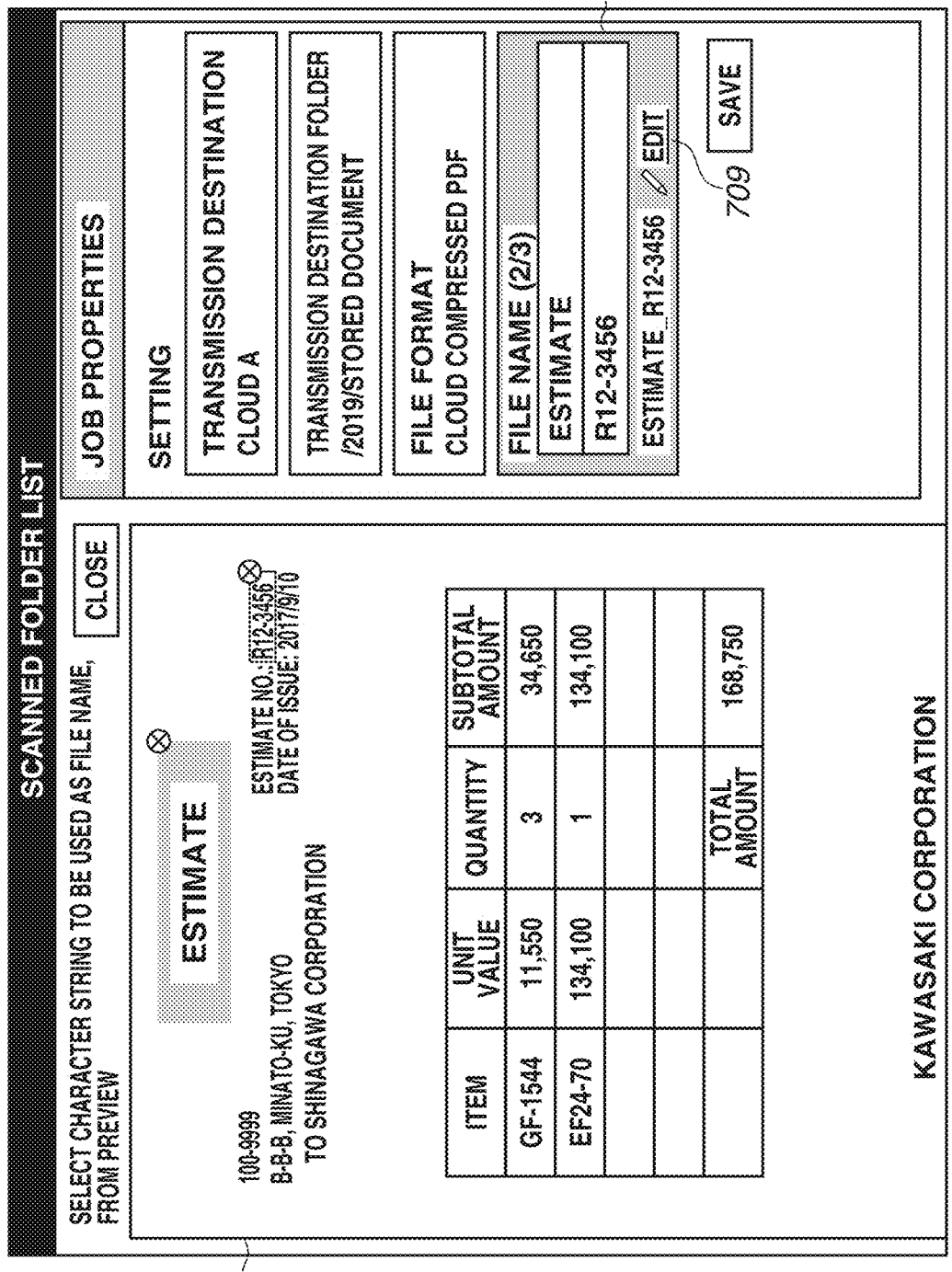

If the user clicks the file name edit button 708, in step S531, the client PC 111 transmits a file name edit screen request to the MFP cooperation service 120. The MFP cooperation service 120 transmits information used for displaying an edit screen, such as a preview image of the scanned form, a coordinate of a character region, and a character recognition result, to the client PC 111. The client PC 111 then displays an edit screen, FIGS. 11A to 11D each illustrate an example of the edit screen. FIG. 11A illustrates an example of a screen to be displayed when a character string to be used as a file name has not been selected from a preview image of a scanned form.

A preview 1101 is a scanned form. By clicking a character region desired to be used for a file name, a character string corresponding to the character region can be extracted and added as a file name. As described, below, by learning a character region for extracting a character string, a file name can be automatically set using a character string in the same character region from next time in a case where the same format (similar form) is scanned.

A button 1102 is used for cancelling editing and returning to the scanned form list screen.

A button 1103 is used for saving the selected character region.

A region 1104 is a region in which a set file name is displayed. In this example, the number of character regions settable as file names is up to three, but the number of character regions may be made unlimited or another upper limit value may be made settable.

FIG. 11B illustrates a state in which the user has selected one character string in a preview image.

A selection border 1105 is displayed such that the selected character string can be identified. Instead of the selection border 1105, a selected character region can be filled with translucent color as long as the character string in a selected state can be recognized. When the user selects a character string in the preview image, an image obtained by extracting the region of the selected character string is displayed in the region of the button 708. Furthermore, the character string in the region selected from the preview image is entered as a value into a region of the button 709.

A button 1106 is used for cancelling a character string in a selected state. If the user clicks the button 1106, the display of the selection border 1105 in the selected state, and the image displayed in the region of the button 708 and the value of the character string in the region of the button 709 that correspond to the selection border 1105 are deleted.

If the user further clicks a character string in the preview 1101, the screen transitions to a screen illustrated in FIG. 11C.

An image corresponding to the region of the selected character string is added to the region of the button 708 below the image added as a first image. Furthermore, a value of the character string added as a second string is added to the region of the button 709. At this time, the first value and the second value may be stacked by a separating character, such as an underscore, a space, or a hyphen, to delimit the first value and the second value. In the example illustrated in FIG. 11C, the first value and the second value are delimited with an underscore.

If the user further selects the third character string in the preview 1101, the screen transitions to a screen illustrated in FIG. 11D.

The selected third character region is displayed in the region of the button 708, and a value of the character string of the region is added to the region of the button 709. If the added value of the character string does not correspond to the image of the character string, or if the user desires to add an arbitrary character string, the value can be directly edited or added after clicking the edit button 709.

If the user clicks the save button 1103, in step S532, the client PC 111 transmits information regarding the selected file name to the MFP cooperation service 120.

In step S533, the MFP cooperation service 120 saves the selected file name of the scanned form.

In step S534, the MFP cooperation service 120 saves setting information, such as the transmission destination, transmission destination folder, output setting, and character region used for the file name that have been set so far, in association with user information and a form ID (described in detail below) uniquely indicating the type of the scanned form.

In other words, a setting information management table (described in detail below) illustrated in FIG. 19A or 19B is generated or updated. The saving timing can be a timing at which the user makes each setting, such as a transmission destination or a file name, or can be a timing at which the user presses the save button 710. The setting information is saved in association also with user information because a file name or a transmission destination to be saved is assumed to vary for each user in some cases. Nevertheless, the configuration of saving setting information is not limited thereto. The setting information may be saved in association only with the form ID, Alternatively, the setting information may be saved in association with another piece of information, or information to be saved in association may be made settable.

If it is determined that a form scanned next time is the same form as this time, Information saved in association with the form ID and the user is automatically allocated. Thus, it is possible to save the same user the trouble of making similar settings many times for the form of the same type.

In a case where information having the same form ID as information to be saved this time has been already saved in the MFP cooperation service 120 at the time of saving information in step S534, the already-saved information is overwritten with the information saved this time. The user may be prompted to check whether to overwrite information each time the information is saved.

The processing in steps S535 to S540 is performed if the cloud storage 130 having metadata is set as a transmission destination of the form data.

If a transmission destination is saved in step S523 and a transmission destination folder is saved in step S527, the save button 710 changes to the enabled state on the scanned form list screen illustrated in FIG. 7. If the user clicks the save button 710 after the change, in step S535, the client PC 111 transmits a metadata request to the MFP cooperation service 120.

In step S536, the MFP cooperation service 120 transmits a metadata acquisition request for a set transmission destination folder to the cloud storage 130.

The cloud storage 130 transmits metadata information set for the transmission destination folder, to the MFP cooperation service 120. The MFP cooperation service 120 transmits information used for displaying the metadata information, to the client PC 111.

The client PC 111 displays the metadata information in the area 704 of job properties.

FIG. 12 illustrates an example of a job property area in which metadata information is displayed.

At this time, the "save" button 710 changes to the "send" button 710.

In an area 1201, the transmission destination setting button 705 and the transmission destination folder setting button 706 are switched only to display setting values. This is to prevent the user from easily changing a transmission destination or a transmission destination folder after displaying the metadata.

A button 1202 is a button used for editing a transmission destination cloud storage service or a transmission destination folder. When the user clicks the button 1202, a confirmation message indicating that the displayed metadata is to be cleared is displayed to the user on the client PC 111.

The user confirms the message, the area 1201 returns to display the original buttons 705 and 706, and a transmission destination cloud storage service and a transmission destination folder become settable again. The "send" button 710 then returns to the "save" button 710 again.

Areas 1203 and 1204 indicate metadata set for the selected transmission destination folder. The area 1203 indicates an example of metadata entered as a value of a character string. Similarly to a file name, a character string in a scanned form image can also be selected and entered in the area 1203.

The area 1204 indicates an example of metadata of date. By clicking an edit button, a calendar is displayed and date can be changed. Since values and types of metadata vary depending on the cloud storage 130, the values and types are not limited to those of the metadata illustrated in this example.

When the user enters a character string in a preview image into the area 1203 as a value of metadata, the user clicks the area 1203. In step S537, the client PC 111 then transmits a metadata edit screen request to the MFP cooperation service 120 and displays the edit screens illustrated in FIGS. 11A to 11D.

After the user selects a character string in a preview image and clicks the save button 1103 on the displayed screen, in step S538, the client PC ill transmits set metadata information to the MFP cooperation service 120.

In step S539, the MFP cooperation service 120 saves the transmitted metadata for the scanned form.

In step S540, the MFP cooperation service 120 saves the changed setting information in association with a form ID and the user. The MFP cooperation service 120 transmits information used for displaying a screen with updated information, to the client PC 111, and the client PC 111 displays the scanned form list screen.

When the user clicks the send button 710, in step S541, the client PC 111 executes transmission processing of data to be transmitted.

In step S542, the MFP cooperation service 120 generates a file using the set output setting and file name. If any setting has been changed, in step S543, the MFP cooperation service 120 saves the changed setting information in association with the form ID and the user.

In step S544, the MFP cooperation service 120 allocates the entered metadata to the generated file and transmits the generated file to the set transmission destination cloud storage service and transmission destination folder.

If the transmission has been completed, the MFP cooperation service 120 notifies the client PC 111 that the transmission has been completed, and the client PC 111 notifies the user that the transmission has been completed. A scanned form of which the file has been transmitted is deleted from the scanned form list screen.

After the processing performed in step S543, in step S545, the MFP cooperation service 120 saves information regarding a transmission destination cloud storage service and an output setting, among the newly set setting information.

When scan is executed afterward, setting content saved in step S545 is reflected in the settings of a scanned form having no similar form. Since a transmission destination cloud storage service and an output setting are assumed not likely to be changed even if the type of the form varies, it is possible to reduce burden on the user in making settings for a form having no similar form by setting values as default values. Detailed descriptions of each piece of processing will be given below.

<Setting Information Management for Setting-Undesignated Button and Setting-Designated Button>

FIGS. 19A and 19B illustrate setting information management tables.

The setting information management table is a table for holding, for each form type, setting information, such as a transmission destination cloud and an output destination that has been set by the user for a scanned form. The setting information management table is held by the data management unit 434 of the MFP cooperation service 120. The setting-undesignated button and the setting-designated buttons illustrated in FIG. 6A vary in management format of setting information in the MFP cooperation service 120.

Management tables 1910 and 1920 indicate the setting-undesignated button, and hold setting information in association with buttons and a user, A table is created for each form ID uniquely indicating a form type. In a case of a user A, tables are respectively created for the two form IDs 1910 and 1920.

A column 1901 indicates a user name associated with a table. A column 1902 indicates a transmission destination cloud storage service set by the user in the past for a form corresponding to a form ID. A column 1903 indicates a transmission destination folder, a column 1904 indicates an output setting, and a column 1905 indicates arrangement information of a character region. That is to say, the column 1905 indicates location information of a character region used for setting a file name.

If the user A scans a form similar to a form having a form ID: "aaaaaaaa-ffff-49ab-acf8-55558888eeee", setting information, such as a transmission destination cloud service indicated in the management table 1910, is reflected as settings for the scanned form. The management table is updated each time the user A executes scan and designates setting information.

A management table 1930 indicates an example of a management table corresponding to the setting-designated buttons. Unlike the management tables 1910 and 1920, the management table 1930 is not associated with a user. In other words, no matter who executes scan and designation of setting information, the management table 1930 is updated.

The description has been given of an example in which setting information corresponding to a form ID is defined by only one row, and the table is updated each time the user executes scan and the designation of setting information. In other words, when the user scans a new form, the user can reflect latest setting information set for a form similar to the new form. The number of rows used for defining setting information corresponding to a form ID needs not to be limited to one, and setting information can be newly added each time the user executes scan and the designation of setting information. Setting information to be reflected may be determined based on, for example, a usage frequency of setting information.

<Form Classification Processing>

Figure 13:
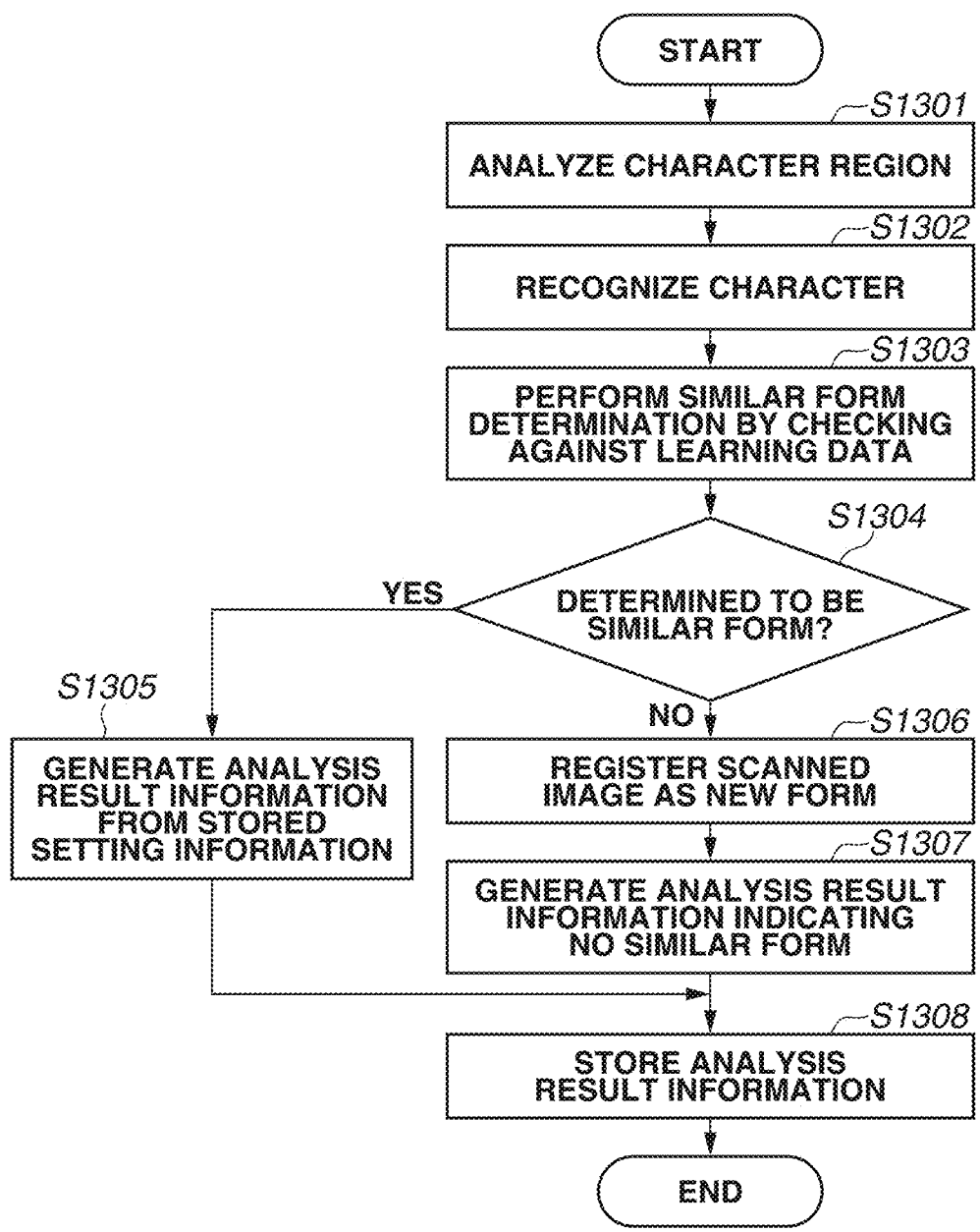
FIG. 13 is a flowchart illustrating details of image analysis processing performed by the MFP cooperation service in the present system.

FIG. 13 is a flowchart illustrating the details of image analysis processing to be performed by the image processing unit 432 in the present system.

Each piece of processing is implemented by the CPU 311 loading a program stored in the ROM 312 or the HDD 314 of the MIP cooperation service 120, onto the RAM 313, and executing the program. The flowchart illustrates details of the processing to be executed by the image processing unit 432 of the MFP cooperation service 120 in steps S514 to S516 in FIG. 5A after the image processing unit 432 receives an image processing request from the request control unit 431 in step S512.

In step S1301, the image processing unit 432 analyzes a character region of the form scanned in step S509, and acquires a character region group in the form.

In step S1302, the image processing unit 432 performs character recognition processing on all character string regions detected by the analysis performed in step S1301.

In step S1303, the image processing unit 432 performs similar form determination using the information detected in steps S1301 and S1302. In the similarity determination, the image processing unit 432 compares arrangement information of images scanned previously and arrangement information of an image scanned this time using arrangement information of character regions. If there is an image that has been scanned in the past and has the arrangement of a similar character region, the image processing unit 432 determines that there is a similar form. In other words, the image processing unit 432 determines whether the MFP cooperation service 120 holds a setting management information table having the same form ID as a form ID of the form analyzed this time.

If it is determined as a result of determination in step S1304 that a similar form has been found, the processing proceeds to step S1305.

In step S1305, the image processing unit 432 generates analysis result information from setting information (i.e., the setting information saved in step S534 in association with the form ID) saved in association with the similar form. The analysis result information is information regarding a transmission destination cloud service and a character string in an image to be used as a file name, which have been set for the similar form. The image processing unit 432 acquires information regarding a character region in the similar form that is used for a file name, detects a character region located at a similar position in the image scanned this time, and acquires a character string in the detected character region.

If it is determined in step S1304 that no similar form has been found, the processing proceeds to step S1306.

In step S1306, the image processing unit 432 newly registers the image scanned this time, as a new form (i.e., as a form having no similar form). The registered information is to be used as one of pieces of form information to be subjected to similar form determination when the analysis processing in FIG. 13 is to be performed next.

In step S1307, the image processing unit 432 generates analysis result information. Since there is no similar form, a character string to be set as a file name has not been acquired.

In step S1308, the image processing unit 432 saves the analysis result information generated in step S1305 or S1307, into the HDD 314 of the MFP cooperation service 120.

FIG. 14 illustrates an example of analysis result information to be saved into the HDD 314 of the MFP cooperation service 120.

In the similar form determination, a value indicating whether an analysis target image and an image scanned previously are similar is stored in a row "matched".

If there is a similar form, the row "matched" indicates "TRUE", and if there is no similar form, the row "matched" indicates "FALSE". The determination as to whether the row "matched" indicates "TRUE" or "FALSE" is made by representing coincidence degrees between arrangement information of images scanned in the past and arrangement information of an image scanned this time, by real number values ranging from 0 to 1. As the real number value becomes larger, a scanned form is more similar to a past form, and the row "matched" is determined "TRUE" or "FALSE" depending on whether the real number value exceeds a predetermined threshold value.

A value uniquely indicating the type of the form is stored in the row "formID". If the form is a similar form, the same form ID is allocated.

If there is a similar form, a transmission destination cloud storage service that has been set for the past similar form is added to "destination".

If there is a similar form, a path of a transmission destination folder that has been set for the past similar form is added to "folderPath". The path uniquely indicates a storage destination folder of the cloud storage 130, and has a format, such as a uniform resource locator (URL), by which the target cloud storage 130 can be recognized.

If there is a similar form, an output setting that has been set for the past similar form is added to "outputSetting".

If there is a similar form, a character string in a character region determined to match a character region in the past similar form that has been used for setting a file name is added to "fileRegion".

The analysis result information includes a coordinate, a width, and a height of a character region in a scanned form, and a character string in each character region, which are not illustrated in FIG. 14. By comparing these pieces of information with information regarding a character region in the past similar form, it is determined whether the character region is a character region corresponding to the same position.

Since the number of character regions that can be used for a file name is limited to three in the present exemplary embodiment, FIG. 14 illustrates three character regions corresponding to "fileRegion0", "fileRegion1", and "fileRegion2". When these character regions are displayed as a file name, the file name is displayed in the form in which values of fileRegion0, fileRegion1, and fileRegion2 are linked by separating characters.

If a duplicate file name is allocated, a unique value to be allocated for preventing the same file name from being allocated is added to "duplicateNum".

If a set transmission destination is a cloud storage service having metadata, and if there is a value that can be entered from information regarding metadata that has been set in the past for the similar form, the value is added to "mnetaData". In a case where a character string in a scanned form is used for metadata similarly to a file name, the value is added when it is determined that there is the same character region.

A row S1401 indicates an example of a part of analysis result information obtained in a case where it is determined that there is a similar form in a cloud storage not having metadata. A transmission destination cloud service and output information that have been set for the similar form (i.e., form having the same form ID) are set.

A row S1402 indicates an example of a part of analysis result information obtained in a case where it is determined that there is a similar form in a cloud storage having metadata.

A row S1403 indicates an example of an analysis result obtained in a case where it is determined that there is no similar form.

As indicated in the rows S1401 and S1402, job property information of a scanned form is added based on settings and input information (setting information management table illustrated in FIG. 19A or 19B) that have been saved in the past in association with the form ID, in a case where it is determined that there is a similar form. As indicated in the row S1403, since the past settings and input information are not saved, default values held by the MFP cooperation service 120 are set as described below, in a case where it is determined that there is no similar form, <Display Processing of Scanned Form Subjected to Similarity Determination>

Figure 15:
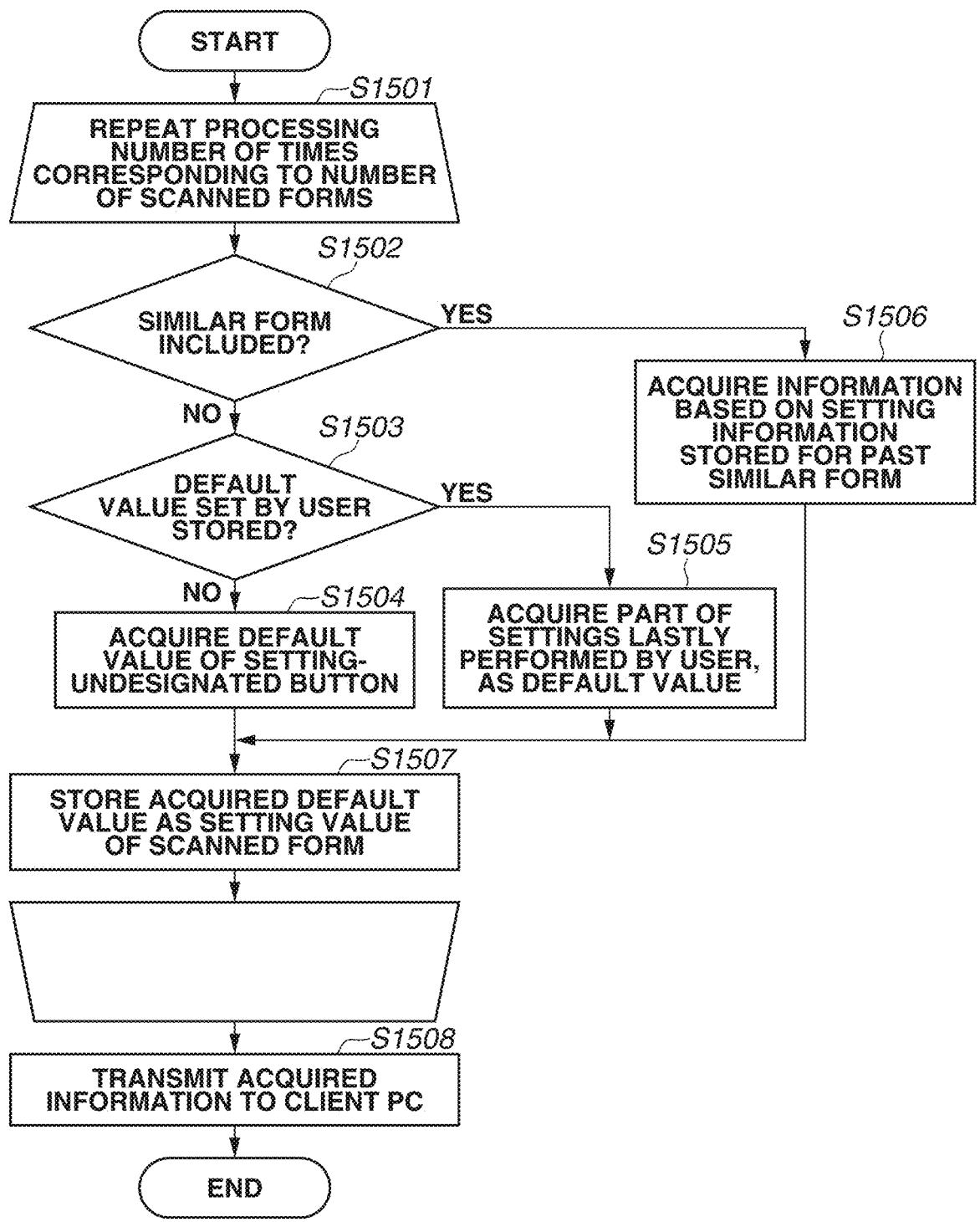
FIG. 15 is a flowchart illustrating details of display processing for a classified scanned form performed by the MFP cooperation service in the present system.

FIG. 15 illustrates a flow of processing performed for the MFP cooperation service 120 acquiring information used for displaying a scanned form list screen, and transmitting the information to the client PC 111, when a scanned form list screen request to be transmitted in step S519 is issued.

Each piece of processing is implemented by the CPU 311 loading a program stored in the ROM 312 or the HDD 314 of the MFP cooperation service 120, onto the RAM 313, and executing the program. If the MFP cooperation service 120 receives an acquisition request for a scanned form list screen from the client PC 111 in step S519, the MFP cooperation service 120 refers to a list of scanned forms currently held by the MFP cooperation service 120, and analysis result information of the scanned forms. The MFP cooperation service 120 refers to information corresponding to the user authenticated by the MFP cooperation service 120.

As illustrated in step S1501, the processing is repeated a number of times corresponding to the number of scanned forms currently held by the MFP cooperation service 120.

In step S1502, the display control unit 435 determines whether the scanned forms include a similar form. The determination is made by determining whether the value of the row "matched" in the analysis result information illustrated in FIG. 14 indicates "TRUE" or "FALSE", In a case of "FALSE" there is no similar form, and thus the processing proceeds to determination in step S1503.

In step S1503, it is determined whether a setting lastly (previously) transmitted by the user is saved, as described below. If the user has ever transmitted a scanned form to the cloud storage 130 in the past, a part of the settings in step S544 is saved as a default value.

If the user transmits a scanned form for the first time (NO in step S1503), the processing proceeds to steps S1504 and S1507. In step S1504, a default value of the setting-undesignated button is acquired. In step S1507, the acquired default value is saved as a setting value of the scanned form. As a specific default value of the setting-undesignated button, only a default value of an output setting is reflected, and setting values of other settings are saved in an unset state.

If it is determined in step S1503 that there is a setting lastly transmitted by the user (YES in step S1503), the processing proceeds to step S1505. In step S1505, among settings lastly transmitted by the user, a transmission destination cloud service and an output setting are reflected, and the other settings are saved in an unset state.

If it is determined in step S1502 that there is a similar form (YES in step S1502), the processing proceeds to step S1506. In step S1506, a setting value acquired from analysis result information is saved for the scanned form.

If there is a default value of the cloud storage 130 that corresponds to metadata, or if another setting is made in such a manner as to enter information referable by the MFP cooperation service 120, such information is also saved for the scanned form. This process is not illustrated in FIGS. 5B and 15.

If the cloud storage 130 as a connection destination is inaccessible, or if a transmission destination folder does not exist, an error point may be notified without saving the corresponding setting value.

If the processing of all scanned forms has been completed, in step S1508, information including setting values saved for the form is transmitted to the client PC 111.

<Processing Performed when Setting of Scanned Form is Saved>

If the user clicks the button 710 to save the scanned form list screen and the button 1103 to save the edit screen, settings are saved for a scanned form and setting information of a similar form is saved, in accordance with changed settings. In other words, information in the setting information management table illustrated in FIG. 19A or 19B is updated, and updated settings are thereafter reflected in the settings for a similar scanned form.

Figure 16:
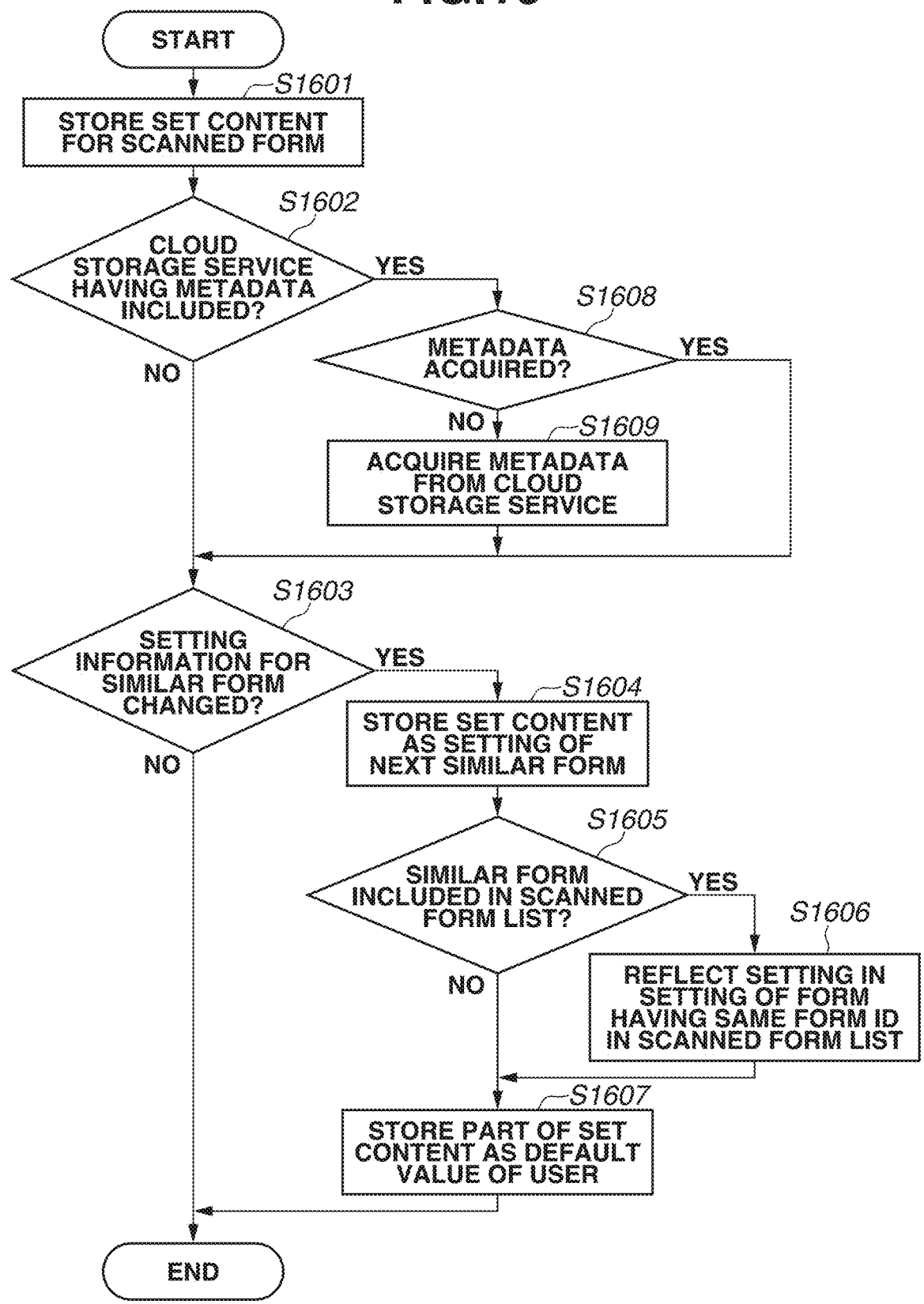
FIG. 16 is a flowchart illustrating details of setting saving processing for a scanned form performed by the MFP cooperation service in the present system.

FIG. 16 illustrates a flow of saving a setting for a scanned form. Each piece of processing is implemented by the CPU 311 loading a program stored in the ROM 312 or the HDD 314 of the MFP cooperation service 120, onto the RAM 313, and executing the program.

When a save button is pressed, in step S1601, set content is saved for a scanned form.

In step S1602, it is determined whether the set content includes information indicating a cloud storage service having metadata.

If information indicating a cloud storage service having metadata is not included (NO in step S1602), the processing proceeds to step S1603. If information indicating a cloud storage service having metadata is included (YES in step S1602), the processing proceeds to step S1608.

In step S1608, it is determined whether metadata has already been acquired.

If metadata has not been acquired (NO in step S1608), the processing proceeds to step S1609. In step S1609, metadata is acquired, and the processing proceeds to step S1603. If metadata has been acquired (YES in step S1608), the processing proceeds to step S1603. Even when the processing proceeds to step S1603 after metadata is acquired in step S1609, the processing in step S1603 and subsequent steps is the same. However, processing including the metadata acquired is added to the processing performed in step S1604 and subsequent steps.

The processing described above corresponds to the processing in steps S533 and S534, S536, and S539 and S540 that is followed by the processing in steps S532, S535, and S538 illustrated in FIG. 5B.

In step S1603, it is determined whether a setting related to a setting information management table of a similar form has been changed, among settings that have been saved for the form this time.

If the setting has not been changed (NO in step S1603), the processing ends. If the setting has been changed (YES in step S1603), the processing proceeds to step S1604. In step S1604, the set content is saved as settings for the similar forms from the next time onward. That is to say, the setting information management table illustrated in FIG. 19A or 19B is updated.

Setting values to be updated include a transmission destination cloud storage service, a transmission destination folder, an output setting, and a character region used for a file name, in the table having the corresponding form ID.

In step S1605, it is determined whether a scanned form list currently held by the MFP cooperation service 120 includes a form similar to a form of which the settings have been changed.

If there is no similar form (NO in step S1605), the processing of saving settings ends. If there is a similar form (YES in step S1605), the processing proceeds to step S1606. In step S1606, the content of the newly-updated setting information management table is reflected in the settings of the scanned form.

In step S1607, a transmission destination cloud storage service and an output setting, among setting values of the scanned form that have been set this time, are saved as default values of the user. The default values of the user are saved in association with the user, and are to be used thereafter as default values of a scanned form that is scanned using the setting-undesignated button and determined to have no similar form.

<Processing of Changing Transmission Destination or Transmission Destination Folder Having Metadata>

Figure 17:
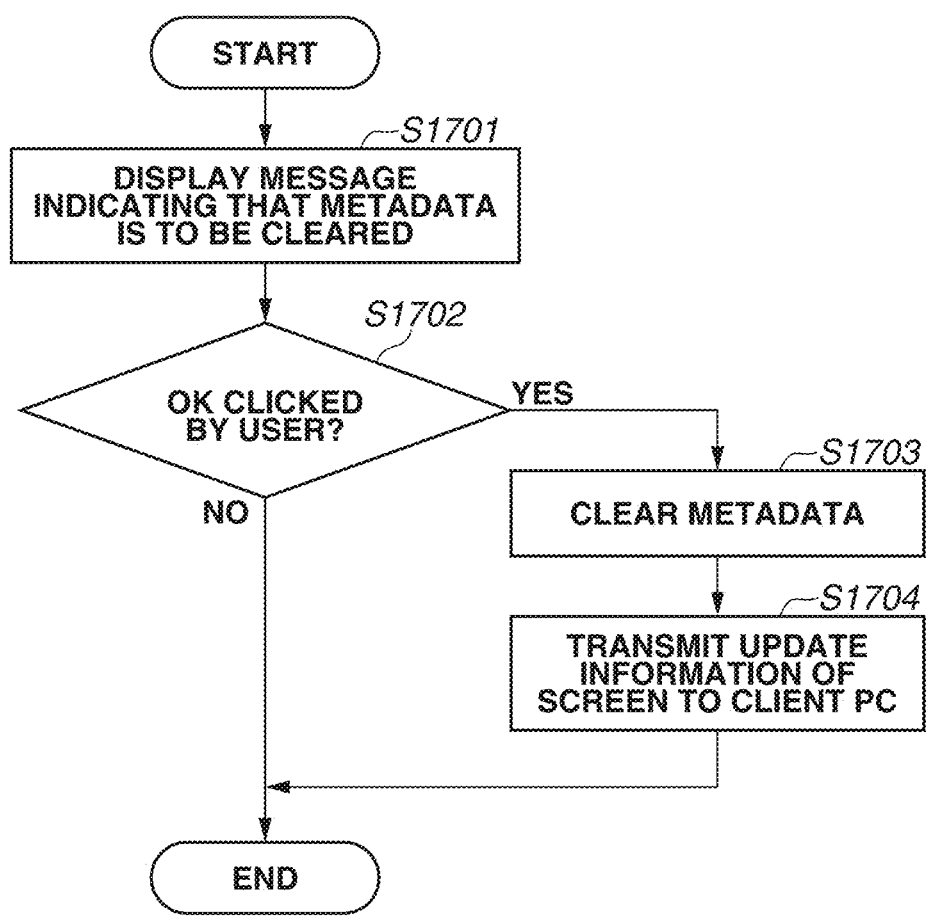
FIG. 17 is a flowchart illustrating details of processing for changing a transmission destination or a transmission destination folder performed by the MFP cooperation service in the present system in a case where a cloud storage service having metadata is set.

FIG. 17 illustrates processing to be performed by the MFP cooperation service 120 in a case where the transmission destination change button 1202 for changing a transmission destination cloud storage service and a transmission destination folder is clicked as described for FIG. 12.

When the user clicks the transmission destination change button 1202, in step S1701, a confirmation message (not illustrated) asking whether it does not matter if metadata is cleared is displayed on the client PC 111.

In step S1702, the display control unit 421 determines whether the user has clicked an "OK" (not illustrated). If the display control unit 421 detects the click (YES in step S1702), the processing proceeds to step S1703. In step S1703, set metadata is cleared. In other words, the metadata acquired from the cloud storage 130 is deleted from the settings for the scanned form.

In step S1704, update information of the screen is transmitted from the MFP cooperation service 120 to the client PC 111.

When the client PC 111 receives the refresh information of the screen, the screen is changed as follows. The display of metadata is deleted from the job property area 704. The button 710 is changed from "send" to "save". The setting value displayed in the area 1201 and the transmission destination change button 1202 return to the transmission destination cloud storage service button 705 and the transmission destination folder button 706. Thereafter, the user can change a transmission destination cloud storage or a transmission destination folder again.

<Processing Performed when Scanned Form is Transmitted>

Figure 18:
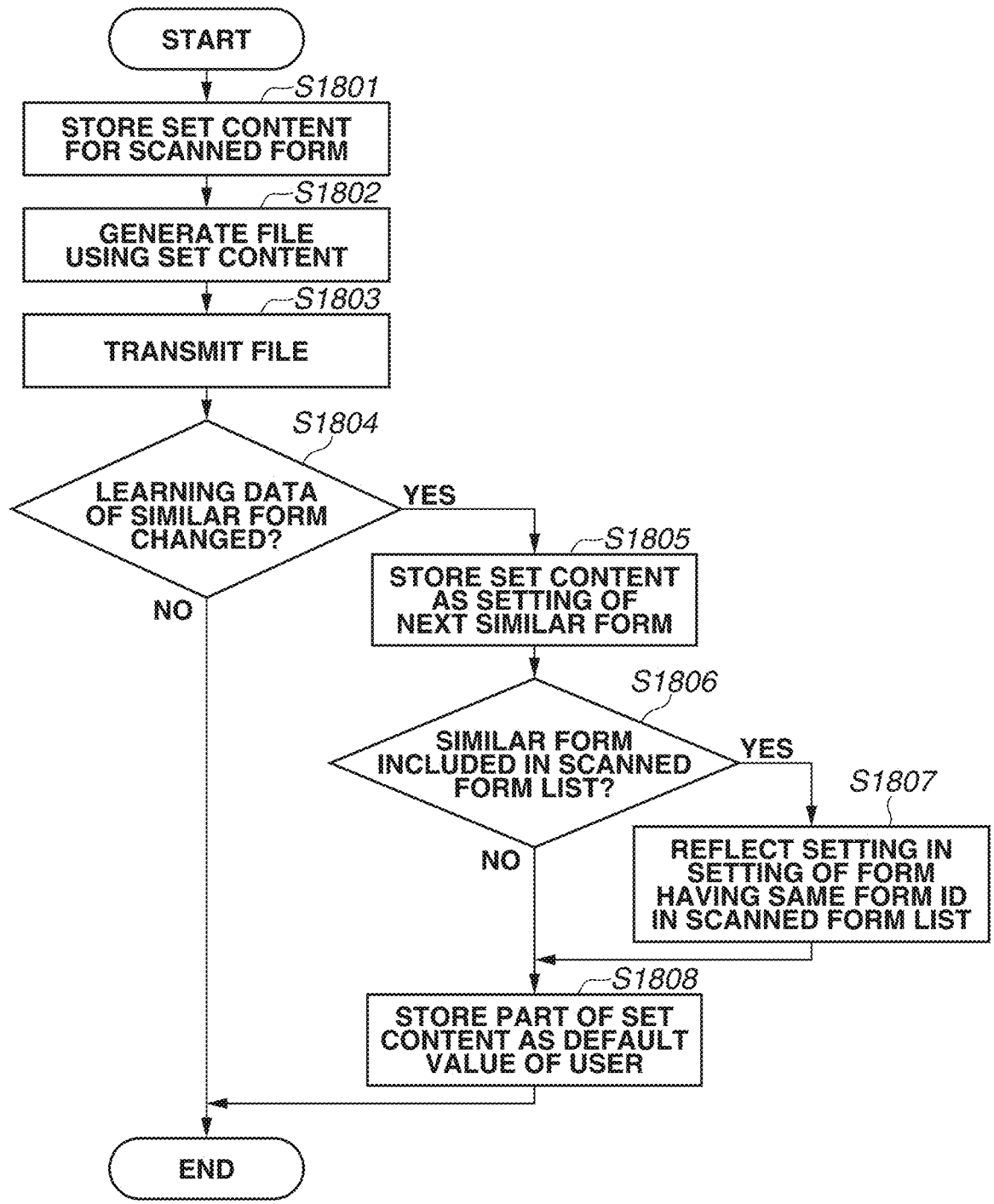
FIG. 18 is a flowchart illustrating details of transmission processing for a scanned form performed by the MFP cooperation service in the present system.

FIG. 18 illustrates a flow of the MFP cooperation service 120 generating a file and transmitting the generated file to a set transmission destination, using information set for a scanned form.

The flow corresponds to the processing in steps S541 to S545 of FIG. 5B. Each piece of processing is implemented by the CPU 311 loading a program stored in the ROM 312 or the HDD 314 of the MFP cooperation service 120, onto the RAM 313, and executing the program.

When the send button 710 is pressed, in step S1801, the MFP cooperation service 120 saves setting information indicated in the job property area 704, for a scanned form. The processing is skipped if no change has been made after the processing of saving settings illustrated in FIG. 16.

In step S1802, a file is generated using the set output setting and file name.

In step S1803, the cloud storage access unit 433 transmits the file generated in step S1802, to a folder of a set transmission destination cloud storage service. At this time, if there is a setting value of metadata, the setting value is simultaneously transmitted. The scanned form is then saved into the cloud storage 130.

In step S1804, settings of the scanned form transmitted this time and setting information (i.e., setting information management table having form a ID corresponding to the form transmitted this time) of a similar form are compared. If no change has been made on the settings (NO in step S1804), the transmission processing ends.

If a change has been made on the settings (YES in step S1804), the processing proceeds to step S1805. In step S1805, the set content is saved as settings for the similar form next.

The processing performed in steps S1805 to S1808 is the same as the processing in steps S1604 to S1607 illustrated in FIG. 16.

According to the above-described exemplary embodiment, it is possible to enhance the operability of the user in transmitting a scanned form to a cloud storage. The user has been conventionally required to set a transmission destination cloud storage and an output setting each time scan data is transmitted. Nevertheless, according to the present exemplary embodiment, if a similar form has been scanned and transmitted in the past, the content set in the past can be reflected in settings to be newly used for scanning and transmitting a form. It is therefore possible to save the user the trouble of making new settings.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-060760, filed Mar. 30, 2020, which is hereby incorporated by reference herein in its entirety.

What is claimed is:

1. A server that can access a cloud service, the server comprising:
a memory storing instructions; and
at least one processor executing the instructions causing the server to:
provide a setting screen for making a first setting for first scanned image data, to a client apparatus;
transmit the first scanned image data to a cloud service in accordance with the first setting that has been received from a user of the client apparatus on the setting screen; and
store, as one of a plurality of settings stored in the memory, the first setting that has been received from the user on the setting screen, in association with both of arrangement information indicating arrangements of character regions included in the first scanned image data and user information regarding the user,
wherein, in a case where a setting screen for making a second setting for new scanned image data is to be provided and where the at least one processor determines that a third setting, which is associated with both of arrangement information similar to arrangement information indicating arrangements of character regions included in the new scanned image data and user information regarding a same user as a user who makes the second setting for the new scanned image data, has been already stored as one of the stored plurality of settings in the memory, the at least one processor provides the setting screen for making the second setting for the new scanned image data in a state where the third setting is reflected without the user selecting the third setting,
wherein, in a case where the setting screen for making the second setting for the new scanned image data is to be provided and where the at least one processor determines that the third setting is not stored in the memory, the at least one processor provides the setting screen for making the second setting for the new scanned image data in a state where a default setting is reflected, and
wherein the default setting is different from the third setting.

2. The server according to claim 1, wherein each of the stored plurality of settings includes a setting regarding at least any of a transmission destination of image data, a region in image data to be set for a file name, and a storage file format of image data.

3. The server according to claim 1, wherein the server can communicate with an image forming apparatus, and the image data is image data generated by reading a form using the image forming apparatus.

4. The server according to claim 1, wherein, in a case where the at least one processor determines that the third setting is not stored in the memory and a fourth setting, which is associated with both of arrangement information non-similar to arrangement information indicating arrangements of character regions included in the new scanned image data and user information regarding a same user as the user who makes the second setting for the new scanned image data, is stored in the memory, the at least one processor provides the setting screen for making the second setting for the new scanned image data in a state where a part of the fourth setting is reflected as the default setting.

5. The server according to claim 4, wherein the part of settings corresponds to settings regarding a transmission destination of image data and a storage file format of image data.

6. The server according to claim 4, wherein, in a case where both of the third setting and the fourth setting are not stored in the memory, the at least one processor provides the setting screen for making the second setting for the new scanned image data in a state where a predetermined setting is reflected as the default setting.

7. The server according to claim 1,
wherein the instructions cause the server to authenticate a user of the client apparatus, and
wherein an operation screen corresponding to the authenticated user is provided, in the provided setting screen.

8. The server according to claim 7, wherein the setting screen is provided in a state where the stored setting corresponding to the authenticated user is reflected in the setting screen, in the provided setting screen.

9. An information processing method for a server that can access a cloud service, the information processing method comprising:
providing a setting screen for making a first setting for first scanned image data, to a client apparatus;
transmitting the first scanned image data to a cloud service in accordance with the first setting that has been received from a user of the client apparatus on the setting screen; and
storing, as one of a plurality of settings stored in a memory, the first setting that has been received from the user on the setting screen, in association with both of arrangement information indicating arrangements of character regions included in the first scanned image data and user information regarding the user,
wherein, in a case where a setting screen for making a second setting for new scanned image data is to be provided and where it is determined that a third setting, which is associated with both of arrangement information similar to arrangement information indicating arrangements of character regions included in the new scanned image data and user information regarding a same user as a user who makes the second setting for the new scanned image data, has been already stored as one of the stored plurality of settings in the memory, the setting screen for making the second setting for the new scanned image data is provided in a state where the third setting is reflected without the user selecting the third setting,
wherein, in a case where the setting screen for making the second setting for the new scanned image data is to be provided and where the at least one processor determines that the third setting is not stored in the memory, the setting screen for making the second setting for the new scanned image data is provided in a state where a default setting is reflected, and
wherein the default setting is different from the third setting.

10. A non-transitory computer-readable storage medium storing a program to cause a computer to perform an information processing method for a server that can access a cloud service, the information processing method comprising:
providing a setting screen for making a first setting for first scanned image data, to a client apparatus;
transmitting the first scanned image data to a cloud service in accordance with the first setting that has been received from a user of the client apparatus on the setting screen; and
storing, as one of a plurality of settings stored in a memory, the first setting that has been received from the user on the setting screen, in association with both of arrangement information indicating arrangements of character regions included in the first scanned image data and user information regarding the user,
wherein, in a case where a setting screen for making a second setting for new scanned image data is to be provided and where it is determined that a third setting, which is associated with both of arrangement information similar to arrangement information indicating arrangements of character regions included in the new scanned image data and user information regarding a same user as a user who makes the second setting for the new scanned image data, has been already stored as one of the stored plurality of settings in the memory, the setting screen for making the second setting for the new scanned image data is provided in a state where the third setting is reflected without the user selecting the third setting,
wherein, in a case where the setting screen for making the second setting for the new scanned image data is to be provided and where the at least one processor determines that the third setting is not stored in the memory, the setting screen for making the second setting for the new scanned image data is provided in a state where a default setting is reflected, and
wherein the default setting is different from the third setting.

* * * * *